United States Patent
Adachi et al.

(10) Patent No.: US 11,643,500 B2
(45) Date of Patent: May 9, 2023

(54) FLUORINATED AROMATIC POLYMER AND METHOD FOR PRODUCING SAME

(71) Applicants: DAIKIN INDUSTRIES, LTD., Osaka (JP); OSAKA UNIVERSITY, Osaka (JP)

(72) Inventors: Kenji Adachi, Osaka (JP); Sensuke Ogoshi, Osaka (JP)

(73) Assignees: DAIKIN INDUSTRIES, LTD., Osaka (JP); OSAKA UNIVERSITY, Osaka (JP)

(*) Notice: Subject to any disclaimer, the term of this patent is extended or adjusted under 35 U.S.C. 154(b) by 0 days.

(21) Appl. No.: 17/271,055

(22) PCT Filed: Aug. 28, 2019

(86) PCT No.: PCT/JP2019/033720
§ 371 (c)(1),
(2) Date: Feb. 24, 2021

(87) PCT Pub. No.: WO2020/045501
PCT Pub. Date: Mar. 5, 2020

(65) Prior Publication Data
US 2021/0253786 A1 Aug. 19, 2021

(30) Foreign Application Priority Data

Aug. 28, 2018 (JP) .............................. JP2018-158944

(51) Int. Cl.
*C08G 61/12* (2006.01)
*C08J 5/18* (2006.01)

(52) U.S. Cl.
CPC .............. *C08G 61/121* (2013.01); *C08J 5/18* (2013.01); *C08G 2261/11* (2013.01); *C08G 2261/146* (2013.01); *C08G 2261/20* (2013.01); *C08G 2261/312* (2013.01); *C08G 2261/334* (2013.01); *C08J 2365/00* (2013.01)

(58) Field of Classification Search
CPC .............................. C08G 61/10; C08G 61/121; C08G 2261/312; C08G 2261/11; C08G 2261/146; C08G 2261/20; C08G 2261/334; C08J 2365/00; C08J 5/18
See application file for complete search history.

(56) References Cited

U.S. PATENT DOCUMENTS

| | | |
|---|---|---|
| 3,644,300 A | 2/1972 | Dorfman et al. |
| 2007/0051510 A1* | 3/2007 | Veneruso ............... E21B 43/128 166/243 |
| 2016/0009876 A1* | 1/2016 | Rodriguez ............... C08J 5/042 427/407.1 |
| 2016/0214999 A1* | 7/2016 | Adachi ................... C07C 25/13 |

FOREIGN PATENT DOCUMENTS

JP  9-59406  3/1997

OTHER PUBLICATIONS

International Search Report dated Dec. 3, 2019 in International (PCT) Application No. PCT/JP2019/033720.
Hicks et al., "Synthesis and modification of octafluoro[2.2]-paracyclophane (parylene AF4)", Org. Chem. Front., 2014, vol. 1, pp. 716-725.
Extended European Search Report dated Jun. 13, 2022, in corresponding European Patent Application No. 19856388.4.
Kotaro Kikushima et al., "Copper-mediated One-pot Synthesis of Trifluorostyrene Derivatives from Tetrafluoroethylene and Arylboronate", Chemistry Letters, vol. 44, No. 7, 2015, pp. 1019-1021.
Hiroki Saijo et al., "Fluoroalkylcopper(I) Complexes Generated by the Carbocupration of Tetrafluoroethylene: Constuction of a Tetrafluoroethylene-Bridging Structure", Journal of the American Chemical Society, vol. 136, No. 43, 2014, pp. 15158-15161.
Mar Tristany et al., "Palladium Nanoparticles Entrapped in Heavily Fluorinated Compounds", Chemical Materials, vol. 18, pp. 716-722, 2006.

* cited by examiner

*Primary Examiner* — Shane Fang
(74) *Attorney, Agent, or Firm* — Wenderoth, Lind & Ponack, L.L.P.

(57) ABSTRACT

The present invention addresses the problem of providing a fluorine-containing aromatic polymer; a method for producing the fluorine-containing aromatic polymer; etc. The problem can be solved by: a polymer having a monomer unit represented by formula (1) (wherein $R^1$ in each occurrence is independently a halogen atom, $NR^{11}R^{12}$ (wherein $R^{11}$ and $R^{12}$ are independently a hydrogen atom or an organic group), or an organic group; n1 is an integer of 0 to 4; two $R^1$'s that can be present in the ortho-positions may form a ring together with two carbon atoms on the adjacent benzene ring, wherein the formed ring may have an organic group as a substituent; and $L^1$ is a single bond, an oxygen atom, a sulfur atom, $-L^{11}-O-$, $-O-L^{12}-O-$, $-L^{13}-S-$, or $-S-L^{14}-S-$ (wherein $L^{11}$ to $L^{14}$ are each independently an alkylene group optionally having one or more substituents); etc.

6 Claims, No Drawings

FLUORINATED AROMATIC POLYMER AND METHOD FOR PRODUCING SAME

TECHNICAL FIELD

The present disclosure relates to a novel fluorine-containing aromatic polymer; a method for producing the fluorine-containing aromatic polymer; and the like.

BACKGROUND ART

Polyparaxylylene has extremely excellent electrical insulation, chemical resistance, heat resistance, cold resistance, gas barrier properties, etc.; and is used for various coatings (e.g., coatings for medical equipment, coatings for electronics, coatings for LED, coatings for automobile parts, and coatings for defense or aerospace industrial equipment).

Polyparaxylylene is produced by vacuum vapor deposition. More specifically, a solid dimer represented by the following formula:

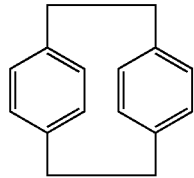 [SMILES: c1cc2ccc1CCc1ccc(cc1)CC2]

(referred to as "diparaxylylene" or "[2,2]paracyclophane") is heated in a vacuum atmosphere to obtain a gas dimer, and the gas dimer is thermally decomposed to generate radicals. The generated radicals are allowed to adhere to the surface of an adherend, and subjected to polymerization to thereby form polyparaxylene (see, for example, Patent Literature (PTL) 1 and Non-Patent Literature (NPL) 1).

CITATION LIST

Patent Literature

PTL 1: JPH9-59406A

Non-Patent Literature

NPL 1: Hicks, Craig; Duffy, Brendan; Hargaden, Grainne C., Organic Chemistry Frontiers (2014), 1(6), 716-725

SUMMARY OF INVENTION

Technical Problem

The method for producing polyparaxylylene by vacuum vapor deposition requires a large vacuum vapor deposition apparatus, and therefore has a problem in terms of increasing capital investment and operating costs. Another problem of this production method is that due to raw material restrictions, only para-isomers of the compound can be synthesized.

An object of the present disclosure is to provide a novel fluorine-containing aromatic polymer; a method for producing the fluorine-containing aromatic polymer; and the like.

Solution to Problem

This disclosure includes the following embodiments.

Item 1.

A polymer having a monomer unit represented by the following formula (1):

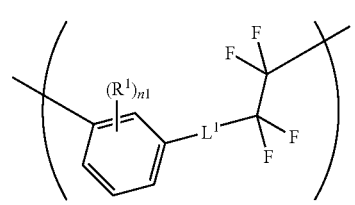

(wherein
$R^1$ in each occurrence is independently
a halogen atom,
$NR^{11}R^{12}$ (wherein $R^{11}$ and $R^{12}$ are independently a hydrogen atom or an organic group), or
an organic group;
n1 is an integer of 0 to 4;
two $R^1$s that can be present in the ortho-positions may form a ring together with two carbon atoms on the adjacent benzene ring, wherein the formed ring may have an organic group as a substituent; and
$L^1$ is a single bond, an oxygen atom, a sulfur atom, $-L^{11}-O-$, $-O-L^{12}-O-$, $-L^{13}-S-$, or $-S-L^{14}-S-$ (wherein $L^{11}$ to $L^{14}$ are each independently an alkylene group optionally having one or more substituents)).

Item 2.

The polymer according to Item 1, wherein $L^1$ is a single bond, an oxygen atom, $-L^{11}-O-$, or $-O-L^{12}-O-$.

Item 3.

The polymer according to Item 1 or 2, wherein n1 is 0, 1, or 2.

Item 4.

The polymer according to any one of Items 1 to 3, further having a monomer unit represented by the following formula (2):

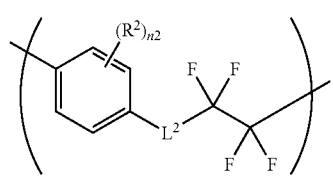

(wherein
$R^2$ in each occurrence is independently
a halogen atom,
$NR^{21}R^{22}$ (wherein $R^{21}$ and $R^{22}$ are independently a hydrogen atom or an organic group), or
an organic group;
n2 is an integer of 0 to 4;
two $R^2$s that can be present in the ortho-positions may form a ring together with two carbon atoms on the adjacent benzene ring, wherein the formed ring may have an organic group as a substituent; and
$L^2$ is a single bond, an oxygen atom, a sulfur atom, $-L^{21}-O-$, $-O-L^{22}-O-$, $-L^{23}-S-$, or $-S-L^{24}-S-$ (wherein $L^{21}$ to $L^{24}$ are each independently an alkylene group optionally having one or more substituents)).

Item 5.

The polymer according to Item 4, wherein $L^2$ is a single bond, an oxygen atom, $-L^{21}-O-$, or $-O-L^{22}-O-$.

Item 6.

A polymer having a monomer unit represented by the following formula (1'):

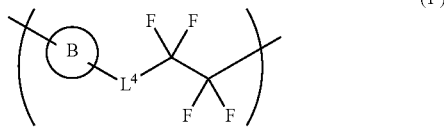

(wherein

B is a heteroarylene group optionally having one or more substituents; and $L^4$ is a single bond, an oxygen atom, a sulfur atom, $-L^{41}$-O—, —O-$L^{42}$-O—, -$L^{43}$-S—, or —S-$L^{44}$-S— (wherein $L^{41}$ to $L^{44}$ are each independently an alkylene group optionally having one or more substituents)).

Item 7.

The polymer according to Item 6, wherein B is a furan-diyl group, an oxazole-diyl group, an isoxazole-diyl group, an oxadiazole-diyl group, a thiophene-diyl group, a thiazole-diyl group, an isothiazole-diyl group, a thiadiazole-diyl group, a pyrrole-diyl group, a pyrazole-diyl group, an imidazole-diyl group, a triazole-diyl group, a pyridine-diyl group, a pyridazine-diyl group, a pyrimidine-diyl group, a pyrazine-diyl group, a triazine-diyl group, or a tetrazine-diyl group, each group optionally having one or more substituents.

Item 8.

The polymer according to Item 6 or 7, wherein $L^4$ is a single bond, an oxygen atom, -$L^{41}$-O—, or —O-$L^{42}$-O—.

Item 9.

A method for producing a polymer having a monomer unit represented by the following formula (3):

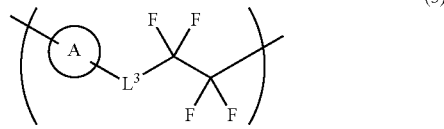

(wherein

A is an arylene group optionally having one or more substituents, or a heteroarylene group optionally having one or more substituents; and $L^3$ is a single bond, an oxygen atom, a sulfur atom, -$L^{31}$-O—, —O-$L^{32}$-O—, -$L^{33}$-S—, or —S-$L^{34}$-S— (wherein $L^{31}$ to $L^{34}$ are each independently an alkylene group optionally having one or more substituents));

the method comprising polymerizing a monomer containing a compound represented by the following formula (4):

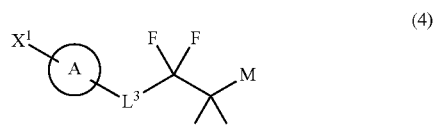

(wherein $X^1$ is a halogen atom selected from the group consisting of a chlorine atom, a bromine atom, and an iodine atom;

M is a metal selected from the group consisting of copper, zinc, nickel, iron, cobalt, and tin; and A and $L^3$ are as defined above); and a ligand selected from the group consisting of compounds having a pyridine ring, and phosphines.

Item 10.

The method according to Item 9, wherein A is a phenylene group, a furan-diyl group, an oxazole-diyl group, an isoxazole-diyl group, an oxadiazole-diyl group, a thiophene-diyl group, a thiazole-diyl group, an isothiazole-diyl group, a thiadiazole-diyl group, a pyrrole-diyl group, a pyrazole-diyl group, an imidazole-diyl group, a triazole-diyl group, a pyridine-diyl group, a pyridazine-diyl group, a pyrimidine-diyl group, a pyrazine-diyl group, a triazine-diyl group, or a tetrazine-diyl group, each group optionally having one or more substituents.

Item 11.

The method according to Item 9 or 10, wherein $L^3$ is a single bond, an oxygen atom, -$L^{31}$-O—, or —O-$L^{32}$-O—.

Item 12.

The method according to any one of Items 9 to 11, wherein the polymerization is performed in the presence of a solvent.

Item 13.

The method according to any one of Items 9 to 12, wherein the polymerization is performed in a range of 50 to 150° C.

Item 14.

A film containing the polymer of any one of Items 1 to 8.

Advantageous Effects of Invention

According to the present disclosure, a novel fluorine-containing aromatic polymer; a method for producing the fluorine-containing aromatic polymer; etc., are provided. More specifically, according to the present disclosure, there are provided a polymer having a monomer unit represented by formula (1), which cannot be produced by a conventional vacuum vapor deposition method; a method for producing the polymer; etc.

DESCRIPTION OF EMBODIMENTS

The above summary of the present disclosure is not intended to describe each disclosed embodiment or every implementation of the present disclosure.

The following description of the present disclosure more particularly exemplifies illustrative embodiments.

In several places throughout the present disclosure, guidance is provided through lists of examples, and these examples can be used in various combinations.

In each instance, the described list serves only as a representative group, and should not be interpreted as an exclusive list.

All publications, patents, and patent applications cited herein are incorporated herein by reference in their entirety.

Terms

Unless otherwise specified, the symbols and abbreviations herein can be understood in the context of the present specification in the meanings commonly used in the art to which the present disclosure belongs.

The term "contains" as used herein is intended to include "consisting essentially of" and "consisting of."

Unless otherwise specified, the steps, treatments, or operations described herein can be performed at room temperature.

The room temperature referred to herein can mean a temperature in the range of 10 to 40° C.

The notation "$C_{n-m}$" (where n and m are each a number) used herein means that the number of carbon atoms is n or more and m or less, as is usually understood by persons skilled in the art.

Examples of the "halogen atom" in the present specification include a fluorine atom, a chlorine atom, a bromine atom, and an iodine atom, unless otherwise specified.

The "organic group" in the present specification means a group formed by removing one hydrogen atom from an organic compound.

Examples of the "organic group" include
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
an aldehyde group,
RO—,
RS—,
RCO—,
RSO$_2$—,
ROCO—, and
ROSO$_2$—
(wherein R is independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents).

Examples of the "substituents" include a halogen atom, a cyano group, an amino group, an alkoxy group, and an alkylthio group. Two or more substituents may be the same or different from each other.

Examples of the "alkyl" in the present specification include linear or branched $C_{1-10}$ alkyl groups, such as methyl, ethyl, propyl (e.g., propyl and isopropyl), butyl (e.g., n-butyl, isobutyl, sec-butyl, and tert-butyl), pentyl (e.g., n-pentyl, isopentyl, and neopentyl), and hexyl, unless otherwise specified.

Examples of the "alkoxy" in the present specification include linear or branched $C_1$-$C_{10}$ alkoxy groups, such as methoxy, ethoxy, propoxy (e.g., n-propoxy and isopropoxy), butoxy (e.g., n-butoxy, isobutoxy, sec-butoxy, and tert-butoxy), pentyloxy, and hexyloxy, unless otherwise specified.

Examples of the "alkylthio" in the present specification include linear or branched $C_1$-$C_{10}$ alkylthio groups, such as methylthio, ethylthio, propylthio (n-propylthio, isopropylthio), butylthio (e.g., n-butylthio, isobutylthio, sec-butylthio, and tert-butylthio), pentylthio, and hexylthio, unless otherwise specified.

Examples of the "alkenyl" in the present specification include linear or branched $C_{2-10}$ alkenyl groups, such as vinyl, 1-propen-1-yl, 2-propen-1-yl, isopropenyl, 2-buten-1-yl, 4-penten-1-yl, and 5-hexen-1-yl, unless otherwise specified.

Examples of the "alkynyl" in the present specification include linear or branched $C_{2-10}$ alkynyl groups, such as ethynyl, 1-propyn-1-yl, 2-propyn-2-yl, 4-pentyn-1-yl, and 5-hexyn-1-yl, unless otherwise specified.

Examples of the "cycloalkyl" in the present specification include $C_{3-10}$ cycloalkyl groups, such as cyclopropyl, cyclobutyl, cyclopentyl, cyclohexyl, and cycloheptyl, unless otherwise specified.

Examples of the "cycloalkenyl" in the present specification include $C_{3-10}$ cycloalkyl groups, such as cyclopropyl, cyclobutyl, cyclopentyl, cyclohexyl, and cycloheptyl, unless otherwise specified.

Examples of the "cycloalkadienyl" in the present specification include $C_{4-10}$ cycloalkadienyl groups, such as cyclobutadienyl, cyclopentadienyl, cyclohexadienyl, cycloheptadienyl, cyclooctadienyl, cyclononadienyl, and cyclodecadienyl, unless otherwise specified.

The "aryl" in the present specification can be monocyclic, bicyclic, tricyclic, or tetracyclic, unless otherwise specified.

The "aryl" in the present specification can be a $C_{6-18}$ aryl group, unless otherwise specified.

Examples of the "aryl" in the present specification include phenyl, 1-naphthyl, 2-naphthyl, 2-biphenyl, 3-biphenyl, 4-biphenyl, and 2-anthryl, unless otherwise specified.

The "arylene" in the present specification means a group formed by removing one hydrogen atom from an "aryl" group.

Examples of the "arylene" in the present specification include 1,2-phenylene, 1,3-phenylene, 1,4-phenylene, 4,4'-biphenylene, 1,2-naphthylene, 1,3-naphthylene, and 1,4-naphthylene, unless otherwise specified.

Examples of the "aralkyl" in the present specification include benzyl, phenethyl, diphenylmethyl, 1-naphthylmethyl, 2-naphthylmethyl, 2,2-diphenylethyl, 3-phenylpropyl, 4-phenylbutyl, 5-phenylpentyl, 2-biphenylmethyl, 3-biphenylmethyl, and 4-biphenylmethyl, unless otherwise specified.

The "non-aromatic heterocyclic group" in the present specification means a group formed by removing one hydrogen atom from a non-aromatic heterocycle.

The "non-aromatic heterocyclic group" in the present specification can be monocyclic, bicyclic, tricyclic, or tetracyclic, unless otherwise specified.

The "non-aromatic heterocyclic group" in the present specification can be saturated or unsaturated, unless otherwise specified.

The "non-aromatic heterocyclic group" in the present specification can be a 5- to 18-membered non-aromatic heterocyclic group, unless otherwise specified.

Unless otherwise specified, the "non-aromatic heterocyclic group" in the present specification can be, for example, a non-aromatic heterocyclic group containing, in addition to carbon atoms, 1 to 4 heteroatoms selected from oxygen, sulfur, and nitrogen atoms as a ring-constituting atom.

Unless otherwise specified, examples of the "non-aromatic heterocyclic group" in the present specification include tetrahydrofuryl, oxazolidinyl, imidazolinyl (e.g., 1-imidazolinyl, 2-imidazolinyl, and 4-imidazolinyl), aziridinyl (e.g., 1-aziridinyl and 2-aziridinyl), pyrrolidinyl (e.g., 1-pyrrolidinyl, 2-pyrrolidinyl, and 3-pyrrolidinyl), piperidinyl (e.g., 1-piperidinyl, 2-piperidinyl, and 3-piperidinyl), azepanyl (e.g., 1-azepanyl, 2-azepanyl, 3-azepanyl, and 4-azepanyl), azocanyl (e.g., 1-azocanyl, 2-azocanyl, 3-azocanyl, and 4-azocanyl), piperazinyl (e.g., 1,4-piperazin-1-yl and 1,4-piperazin-2-yl), diazepinyl (e.g., 1,4-diazepin-1-yl, 1,4-diazepin-2-yl, 1,4-diazepin-5-yl, and 1,4-diazepin-6-yl), diazocanyl (e.g., 1,4-diazocan-1-yl, 1,4-diazocan-2-yl, 1,4-diazocan-5-yl, 1,4-diazocan-6-yl, 1,5-diazocan-1-yl, 1,5-diazocan-2-yl, and 1,5-diazocan-3-yl), tetrahydropyranyl (e.g., tetrahydropyran-4-yl), morpholinyl (e.g., 4-morpholinyl), thiomorpholinyl (e.g., 4-thiomorpholinyl), 2-oxazolidinyl, dihydrofuryl, dihydropyranyl, dihydroquinolyl, and the like.

The "heteroaryl" in the present specification can be monocyclic, bicyclic, tricyclic, or tetracyclic, unless otherwise specified.

The "heteroaryl" in the present specification can be, for example, a 5- to 18-membered heteroaryl group.

Unless otherwise specified, the "heteroaryl" in the present specification can be, for example, a heteroaryl group containing, in addition to carbon atoms, 1 to 4 hetercatoms selected from oxygen, sulfur, and nitrogen atoms as a ring-constituting atom.

The "heteroaryl" in the present specification includes "monocyclic heteroaryl" and "aromatic fused heterocyclic group," unless otherwise specified.

Unless otherwise specified, examples of the "monocyclic heteroaryl" in the present specification include pyrrolyl (e.g., 1-pyrrolyl, 2-pyrrolyl, and 3-pyrrolyl), furyl (e.g., 2-furyl and 3-furyl), thienyl (e.g., 2-thienyl and 3-thienyl), pyrazolyl (e.g., 1-pyrazolyl, 3-pyrazolyl, and 4-pyrazolyl), imidazolyl (e.g., 1-imidazolyl, 2-imidazolyl, and 4-imidazolyl), isoxazolyl (e.g., 3-isoxazolyl, 4-isoxazolyl, and 5-isoxazolyl), oxazolyl (e.g., 2-oxazolyl, 4-oxazolyl, and 5-oxazolyl), isothiazolyl (e.g., 3-isothiazolyl, 4-isothiazolyl, and 5-isothiazolyl), thiazolyl (e.g., 2-thiazolyl, 4-thiazolyl, and 5-thiazolyl), triazolyl (e.g., 1,2,3-triazol-4-yl and 1,2,4-triazol-3-yl), oxadiazolyl (e.g., 1,2,4-oxadiazol-3-yl and 1,2,4-oxadiazol-5-yl), thiadiazolyl (e.g., 1,2,4-thiadiazol-3-yl and 1,2,4-thiadiazol-5-yl), tetrazolyl, pyridyl (e.g., 2-pyridyl, 3-pyridyl, and 4-pyridyl), pyridazinyl (e.g., 3-pyridazinyl and 4-pyridazinyl), pyrimidinyl (e.g., 2-pyrimidinyl, 4-pyrimidinyl, and 5-pyrimidinyl), pyrazinyl, and the like.

Unless otherwise specified, examples of the "aromatic fused heterocyclic group" in the present specification include isoindolyl (e.g., 1-isoindolyl, 2-isoindolyl, 3-isoindolyl, 4-isoindolyl, 5-isoindolyl, 6-isoindolyl, and 7-isoindolyl), indolyl (e.g., 1-indolyl, 2-indolyl, 3-indolyl, 4-indolyl, 5-indolyl, 6-indolyl, and 7-indolyl), benzo[b]furanyl (e.g., 2-benzo[b]furanyl, 3-benzo[b]furanyl, 4-benzo[b]furanyl, 5-benzo[b]furanyl, 6-benzo[b]furanyl, and 7-benzo[b]furanyl), benzo[c]furanyl (e.g., 1-benzo[c]furanyl, 4-benzo[c]furanyl, and 5-benzo[c]furanyl), benzo[b]thienyl (e.g., 2-benzo[b]thienyl, 3-benzo[b]thienyl, 4-benzo[b]thienyl, 5-benzo[b]thienyl, 6-benzo[b]thienyl, and 7-benzo[b]thienyl), benzo[c]thienyl (e.g., 1-benzo[c]thienyl, 4-benzo[c]thienyl, and 5-benzo[c]thienyl), indazolyl (e.g., 1-indazolyl, 2-indazolyl, 3-indazolyl, 4-indazolyl, 5-indazolyl, 6-indazolyl, and 7-indazolyl), benzimidazolyl (e.g., 1-benzimidazolyl, 2-benzimidazolyl, 4-benzimidazolyl, and 5-benzimidazolyl), 1,2-benzisoxazolyl (e.g., 1,2-benzisoxazol-3-yl, 1,2-benzisoxazol-4-yl, 1,2-benzisoxazol-5-yl, 1,2-benzisoxazol-6-yl, and 1,2-benzisoxazol-7-yl), benzoxazolyl (e.g., 2-benzoxazolyl, 4-benzoxazolyl, 5-benzoxazolyl, 6-benzoxazolyl, and 7-benzoxazolyl), 1,2-benzisothiazolyl (e.g., 1,2-benzisothiazol-3-yl, 1,2-benzisothiazol-4-yl, 1,2-benzisothiazol-5-yl, 1,2-benzisothiazol-6-yl, and 1,2-benzisothiazol-7-yl), benzothiazolyl (e.g., 2-benzothiazolyl, 4-benzothiazolyl, 5-benzothiazolyl, 6-benzothiazolyl, and 7-benzothiazolyl), isoquinolyl (e.g., 1-isoquinolyl, 3-isoquinolyl, 4-isoquinolyl, and 5-isoquinolyl), quinolyl (e.g., 2-quinolyl, 3-quinolyl, 4-quinolyl, 5-quinolyl, and 8-quinolyl), cinnolinyl (e.g., 3-cinnolinyl, 4-cinnolinyl, 5-cinnolinyl, 6-cinnolinyl, 7-cinnolinyl, and 8-cinnolinyl), phthalazinyl (e.g., 1-phthalazinyl, 4-phthalazinyl, 5-phthalazinyl, 6-phthalazinyl, 7-phthalazinyl, and 8-phthalazinyl), quinazolinyl (e.g., 2-quinazolinyl, 4-quinazolinyl, 5-quinazolinyl, 6-quinazolinyl, 7-quinazolinyl, and 8-quinazolinyl), quinoxalinyl (e.g., 2-quinoxalinyl, 3-quinoxalinyl, 5-quinoxalinyl, 6-quinoxalinyl, 7-quinoxalinyl, and 8-quinoxalinyl), pyrazolo[1,5-a]pyridyl (e.g., pyrazolo[1,5-a]pyridin-2-yl, pyrazolo[1,5-a]pyridin-3-yl, pyrazolo[1,5-a]pyridin-4-yl, pyrazolo[1,5-a]pyridin-5-yl, pyrazolo[1,5-a]pyridin-6-yl, and pyrazolo[1,5-a]pyridin-7-yl), imidazo[1,2-a]pyridyl (e.g., imidazo[1,2-a]pyridin-2-yl, imidazo[1,2-a]pyridin-3-yl, imidazo[1,2-a]pyridin-5-yl, imidazo[1,2-a]pyridin-6-yl, imidazo[1,2-a]pyridin-7-yl, and imidazo[1,2-a]pyridin-8-yl), and the like.

The "heteroarylene" in the present specification means a group formed by removing one hydrogen atom from the "heteroaryl."

Unless otherwise specified, examples of the "heteroarylene" in the present invention include furan-diyl (e.g., furan-2,5-diyl), oxazole-diyl (e.g., oxazole-2,5-diyl), isoxazole-diyl (e.g., isoxazole-3,5-diyl), oxadiazole (e.g., furazan-3,4-diyl), thiophene-diyl (e.g., thiophene-2,5-diyl), thiazole-diyl (e.g., thiazole-2,5-diyl), isothiazole-diyl (e.g., isothiazole-3,5-diyl), thiadiazole-diyl (e.g., 1,2,5-thiazyle-3,4-diyl), pyrrole-diyl (e.g., pyrrole-2,5-diyl), pyrazole-diyl (e.g., pyrazole-3,5-diyl), imidazole-diyl (e.g., imidazole-2,5-diyl), triazole-diyl (e.g., 1,2,3-triazole-4,5-diyl), pyridine-diyl (e.g., pyridine-1,4-diyl, pyridine-2,3-diyl, pyridine-2,4-diyl, pyridine-2,5-diyl, and pyridine-2,6-diyl), pyridazine-diyl (e.g., pyridazine-4,5-diyl), pyrimidine-diyl (e.g., pyrimidine-2,5-diyl), pyrazole-diyl (e.g., pyrazine-2,6-diyl), triazine-diyl (e.g., 1,3,5-triazine-2,6-diyl), tetrazine-diyl (e.g., 1,2,4,5-tetrazine-3,6-diyl), indole-diyl, benzimidazole-diyl, benzofuran-diyl, benzothiophene-diyl, quinoline-diyl, isoquinoline-diyl, quinazoline-diyl, phthalazine-diyl, and the like.

Polymer Having Monomer Unit Represented by Formula (1)

The polymer according to one embodiment of the present disclosure is a polymer having a monomer unit represented by the following formula (1):

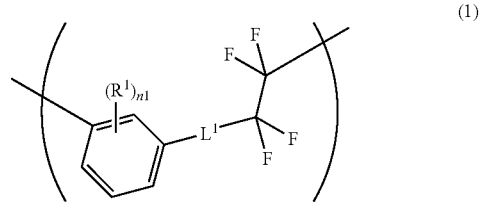

(1)

(wherein
$R^1$ in each occurrence is independently a halogen atom, $NR^{11}R^{12}$ (wherein $R^{11}$ and $R^{12}$ are independently a hydrogen atom or an organic group), or an organic group;
n1 is an integer of 0 to 4;
the two $R^1$s that can be present in the ortho-positions may form a ring together with two carbon atoms on the adjacent benzene ring, wherein the formed ring may have an organic group as a substituent; and
$L^1$ is a single bond, an oxygen atom, a sulfur atom, $-L^{11}$-O—, —O-$L^{12}$-O—, -$L^{13}$-S—, or —S-$L^{14}$-S— (wherein $L^{11}$ to $L^{14}$ are each independently an alkylene group optionally having one or more substituents)). Preferably, the left end of each of the -$L^{11}$-O— and -$L^{13}$-S— is bound to the benzene ring, whereas the right end thereof is bound to the $CF_2$ group.

$R^1$ is preferably a halogen atom, an amino group optionally having one or two alkyl groups as a substituent, or an alkyl group optionally having one or more halogen atoms as substituents. The number of halogen atoms as substituents in the alkyl group is appropriately selected according to the number of hydrogen atoms in the alkyl group. For example, the number of halogen atoms is an integer of 0 to 9. The alkyl group having one or more halogen atoms as substituents (i.e., haloalkyl) can be, for example, an alkyl group in which all of the hydrogen atoms in the alkyl group are substituted with fluorine atoms (i.e., perfluoroalkyl).

$R^1$ is more preferably a halogen atom, an amino group, a $C_{1-10}$ alkyl group, a mono-$C_{1-10}$ alkylamino group, a di-$C_{1-10}$ alkylamino group, or a halo-$C_{1-10}$ alkyl group, and particularly preferably a fluorine atom, a chlorine atom, an amino group, a $C_{1-6}$ alkyl group, mono-$C_{1-6}$ alkylamino group, di-$C_{1-6}$ alkylamino group, or halo-$C_{1-6}$ alkyl group.

When $R^1$ is an alkyl group or the like, the polymer having the monomer unit represented by formula (1) has excellent solvent solubility. Therefore, the polymer can be used as a coating composition or a dip composition containing the polymer and the solvent.

When $R^1$ is a halogen atom, $R^1$ can react with a compound represented by formula (4) described later; and furthermore, for example, a unit represented by formula (1) can be linked thereto. Specifically, the polymer can be a three-dimensional polymer having a unit represented by the following formula:

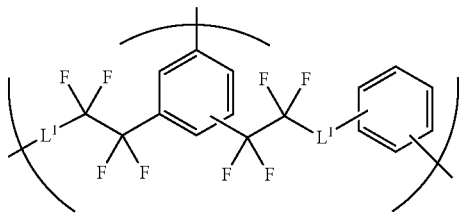

(wherein $L^1$ has the same meaning as described above).

n1 is preferably 0, 1, or 2, more preferably 0 or 1, and particularly preferably 0.

$L^{11}$ to $L^{14}$ are each preferably a $C_{1-6}$ alkylene group, and more preferably a $C_{1-4}$ alkylene group.

$L^1$ is preferably a single bond, an oxygen atom, -$L^{11}$-O—, or —O-$L^{12}$-O—.

When two $R^1$s that are present in the ortho positions form a ring together with two carbon atoms on the adjacent benzene ring, the monomer unit represented by formula (1) is, for example, a unit represented by the following formula (1A) or formula (1B):

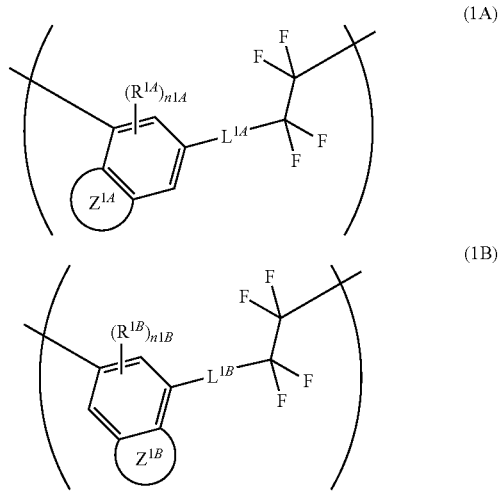

(wherein
$Z^{1A}$ and $Z^{1B}$ each form a fused ring together with the adjacent benzene ring; and
$R^{1A}$ and $R^{1B}$, which are substituents of the fused ring, in each occurrence are independently a halogen atom, $NR^{11A}R^{12A}$ (wherein $R^{11A}$ and $R^{12A}$ are independently a hydrogen atom or an organic group), or an organic group;
$n^{1A}$ and $n^{1B}$ are each an integer of 0 to 4; and
$L^{1A}$ and $L^{1B}$ are each a single bond, an oxygen atom, a sulfur atom, -$L^{11A}$-O—, —O-$L^{12A}$-O—, -$L^{13A}$-S—, or —S-$L^{14A}$-S— (wherein $L^{11A}$ to $L^{14A}$ are each independently an alkylene group optionally having one or more substituents)).

In formula (1A), specific examples of the fused ring formed of $Z^{1A}$ together with the adjacent benzene ring include aromatic fused rings. Examples thereof include naphthalene, indole, benzimidazole, benzofuran, benzothiophene, quinolone, isoquinoline, quinazoline, phthalazine, and benzotriazole.

$R^{1A}$ is preferably a halogen atom, an amino group, an alkyl group, a monoalkylamino group, a dialkylamino group, or a haloalkyl group; more preferably a halogen atom, an amino group, a $C_{1-10}$ alkyl group, a mono-$C_{1-10}$ alkylamino group, a di-$C_{1-10}$ alkylamino group, or a halo-$C_{1-10}$ alkyl group; and particularly preferably a fluorine atom, a chlorine atom, an amino group, a $C_{1-6}$ alkyl group, a mono-$C_{1-6}$ alkylamino group, a di-$C_{1-6}$ alkylamino group, or a halo-$C_{1-6}$ alkyl group.

n1A is preferably 0, 1, or 2; more preferably 0 or 1; and particularly preferably 0.

$L^{11A}$ to $L^{14A}$ are each preferably a $C_{1-6}$ alkylene group, and more preferably a $C_{1-4}$ alkylene group.

$L^{1A}$ is preferably a single bond, an oxygen atom, -$L^{11A}$-O—, or —O-$L^{12A}$-O—.

$Z^{1B}$, n1B, and $L^{1B}$ in formula (1B) are, for example, the same as $Z^{1A}$, n1A, and $L^{1A}$ in formula (1A). Preferred embodiments are also the same.

In the polymer having a monomer unit represented by formula (1), the number of monomer units represented by formula (1) is not particularly limited. For example, the number of monomer units is in the range of 5 to 500000, preferably 10 to 100000, and more preferably 15 to 50000. The structure of the monomer units may be the same or different from each other.

The polymer having the monomer unit represented by formula (1) can be a homopolymer or a copolymer.

The copolymer may be a copolymer having two or more kinds of monomer units represented by formula (1). The copolymer may be, for example, a copolymer of a monomer unit in which n1 in formula (1) is 0 and a monomer unit in which n1 in formula (1) is 1.

The polymer having a monomer unit represented by formula (1) may further contain a polymer unit represented by the following formula (2):

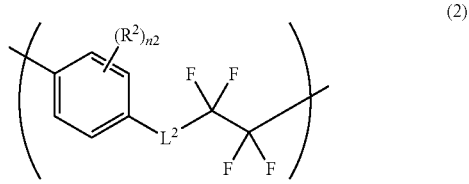

(wherein
$R^2$ in each occurrence is independently a halogen atom, $NR^{21}R^{22}$ (wherein $R^{21}$ and $R^{22}$ are independently a hydrogen atom or an organic group), or an organic group;
n2 is an integer of 0 to 4;
two $R^2$s that can be present in the ortho positions may form a ring together with two carbon atoms on the adjacent benzene ring, wherein the formed ring may have an organic group as a substituent;
$L^2$ is a single bond, an oxygen atom, a sulfur atom, $-L^2-O-$, $-O-L^{22}-O-$, $-L^{23}-S-$, or $-S-L^{24}-S-$ (wherein $L^{21}$ to $L^{24}$ are each independently an alkylene group optionally having one or more substituents)). Preferably, the left end of each of $-L^{21}-O-$ and $-L^{23}-S-$ is bound to the benzene ring, whereas the right end thereof is bound to the $CF_2$ group.

$R^2$ is preferably a halogen atom, an amino group, an alkyl group, a monoalkylamino group, a dialkylamino group, or a haloalkyl group; more preferably a halogen atom, an amino group, a $C_{1-10}$ alkyl group, or a mono-$C_{1-10}$ alkyl group, a di-$C_{1-10}$ alkylamino group, or a halo-$C_{1-10}$ alkyl group; and particularly preferably a fluorine atom, a chlorine atom, an amino group, a $C_{1-6}$ alkyl group, a mono-$C_{1-6}$ alkylamino group, a di-$C_{1-6}$ alkylamino group, or a halo-$C_{1-6}$ (alkyl group.

n2 is preferably 0, 1, or 2; more preferably 0 or 1; and particularly preferably 0.

$L^{21}$ to $L^{24}$ are each preferably a $C_{1-6}$ alkylene group, and more preferably a $C_{1-4}$ alkylene group.

$L^2$ is preferably a single bond, an oxygen atom, $-L^{21}-O-$, or $-OL^{22}-O-$.

When two $R^2$s that are present in the ortho positions form a ring together with two carbon atoms on the adjacent benzene ring, the unit represented by formula (2) is, for example, a unit represented by the following formula (2A):

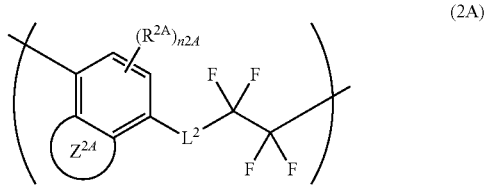

(wherein
$Z^{2A}$ forms a fused ring together with the adjacent benzene ring; substituents $R^{2A}$ on the condensed ring, in each occurrence, are independently a halogen atom, $NR^{21A}R^{22A}$ (wherein $R^{21A}$ and $R^{22A}$ are independently a hydrogen atom or an organic group), or an organic group;
$n^{2A}$ is an integer of 0 to 4;
$L^{2A}$ is a single bond, an oxygen atom, a sulfur atom, $-L^{21A}-O-$, $-O-L^{22A}-O-$, $-L^{23A}-S-$, or $-S-L^{24A}-S-$ (wherein $L^{21A}$ to $L^{24A}$ are each independently an alkylene group optionally having one or more substituents)).

Specific examples of the fused ring formed of $Z^{2A}$ together with the adjacent benzene ring include aromatic fused rings. Examples thereof include naphthalene, indole, benzimidazole, benzofuran, benzothiophene, quinoline, isoquinoline, quinazoline, phthalazine, and benzotriazole.

$R^{2A}$ is preferably a halogen atom, an amino group, an alkyl group, a monoalkylamino group, a dialkylamino group, or a haloalkyl group; more preferably a halogen atom, an amino group, a $C_{1-10}$ alkyl group, or a mono-$C_{1-10}$ alkylamino group, a di-$C_{1-10}$ alkylamino group, or a halo-$C_{1-10}$ alkyl group; and particularly preferably a fluorine atom, a chlorine atom, an amino group, a $C_{1-6}$ alkyl group, a mono-$C_{1-6}$ alkylamino group, a di-$C_{1-6}$ alkylamino group, or a halo-$C_{1-6}$ alkyl group.

n2A is preferably 0, 1, or 2, more preferably 0 or 1, and particularly preferably 0.

$L^{21A}$ to $L^{24A}$ are each preferably represent a $C_{1-6}$ alkylene group, and more preferably a $C_{1-4}$ alkylene group.

$L^{2A}$ is preferably a single bond, an oxygen atom, $-L^{21A}-O-$, or $-O-L^{22A}-O-$.

In the polymer having the monomer unit represented by formula (1), the number of monomer units represented by formula (2) is not particularly limited. For example, the number of monomer units is in the range of 5 to 500000, preferably 10 to 100,000, and more preferably 15 to 50000. The structure of the monomer units may be the same or different from each other.

The molar ratio of monomer units represented by formula (1) to monomer units represented by formula (2) is not particularly limited. For example, the molar ratio is in the range of 10:90 to 90:10, preferably 20:80 to 80:20, and more preferably 30:70 to 70:30.

Polymer Having Monomer Unit Represented by Formula (1')

The polymer according to another embodiment of the present disclosure is a polymer having a monomer unit represented by the following formula (1'):

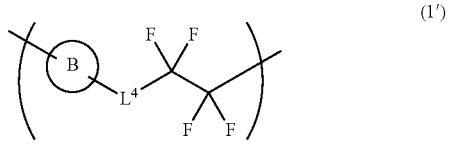

(wherein
B is a heteroarylene group optionally having one or more substituents; and
$L^4$ is a single bond, an oxygen atom, a sulfur atom, $-L^{41}-O-$, $-O-L^{42}-O-$, $-L^{43}-S-$, or $-S-L^{44}-S-$ (wherein $L^{41}$ to $L^{44}$ independently represent an alkylene group optionally having one or more substituents)). Preferably, the left end of each of $-L^{41}-O-$ and $-L^{43}-S-$ is bound to B and the right end thereof is bound to the $CF_2$ group.

B is preferably a 5- to 10-membered heteroarylene group optionally having one or more substituents; and more preferably a group optionally having one or more substituents and selected from the group consisting of a furan-diyl group, an oxazole-diyl group, an isoxazole-diyl group, an oxadiazole-diyl group, a thiophene-diyl group, a thiazole-diyl group, an isothiazole-diyl group, a thiadiazole-diyl group, a pyrrole-diyl group, a pyrazole-diyl group, an imidazole-diyl group, a triazole-diyl group, a pyridine-diyl group, a pyridazine-diyl group, a pyrimidine-diyl group, a pyrazine-diyl group, a triazine-diyl group, or a tetrazine-diyl group.

The substituent is preferably a halogen atom, an organic group optionally having one or two organic groups as substituents, or an organic group; more preferably a halogen atom, an amino group, an alkyl group, a monoalkyl group, or a haloalkyl group; even more preferably a halogen atom, an amino group, a $C_{1-6}$ alkyl group, a mono-$C_{1-6}$ alkylamino group, a di-$C_{1-6}$ alkylamino group, or a halo-$C_{1-6}$ alkyl group; and particularly preferably a fluorine atom, a chlorine atom, an amino group, a $C_{1-4}$ alkyl group, a mono-$C_{1-4}$ alkylamino group, a di-$C_{1-4}$ alkylamino group, or a perfluoro-$C_{1-2}$ alkyl group.

$L^{41}$ to $L^{44}$ are each preferably a $C_{1-6}$ alkylene group, and more preferably a $C_{1-4}$ alkylene group.

$L^4$ is preferably a single bond, an oxygen atom, -$L^{41}$-O—, or —O-$L^{42}$-O—.

The polymer having a monomer unit represented by formula (1') can be a homopolymer or a copolymer.

The copolymer may be a copolymer comprising two or more kinds of monomer units represented by formula (1'). For example, the copolymer may comprise a monomer unit in which B in formula (1') is an unsubstituted heteroarylene group and a monomer unit in which B in formula (1') is a heteroarylene group having one or more substituents.

The polymer having a monomer unit represented by formula (1') may further comprise at least one selected from the group consisting of monomer units represented by formula (1) and monomer units represented by formula (2).

The polymer having a monomer unit represented by formula (1) or formula (1)' can be, for example, in a linear or branched (e.g., star-shaped, comb-shaped) form.

The form of the copolymer having a monomer unit represented by formula (1) or formula (1)' (e.g., a copolymer having a monomer unit represented by formula (1) and a monomer unit represented by formula (2)) can be, for example, a random copolymer, an alternating copolymer, a block copolymer, or a graft copolymer.

Conventional polyparaxylylenes have a peak in the range of 300 to 350° C. in differential scanning calorimetry (DSC). In contrast, polymers having a monomer unit represented by formula (1) or formula (1)' preferably do not have any peaks over the range of 300 to 350° C. in the DSC. Since the polymer having a monomer unit represented by formula (1) or formula (1)' has such low crystallinity, good processability can be obtained.

For example, in a thermogravimetric measurement at a temperature-increasing rate of 10° C./min, the polymer having a monomer unit represented by formula (1) or formula (1)' has a temperature of 5% mass loss in the range of 510 to 530° C.

The glass transition temperature (Tg) of the polymer having a monomer unit represented by formula (1) or formula (1)' is not particularly limited; and can be, for example, in the range of 500 to 550° C.

Method for Producing Polymer Having Monomer Unit Represented by Formula (3)

The method for producing a polymer according to one embodiment of the present disclosure is a method of producing a polymer having a monomer unit represented by the following formula (3):

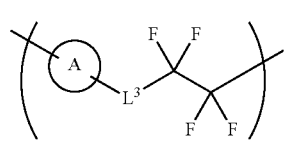

(wherein
A is an arylene group optionally having one or more substituents, or a heteroarylene group optionally having one or more substituents; and
$L^3$ is a single bond, an oxygen atom, a sulfur atom, -$L^{31}$-O—, —O-$L^{32}$-O—, -$L^{33}$-S—, or —S-$L^{34}$-S— (wherein $L^{31}$ to $L^{34}$ are each independently an alkylene group optionally having one or more substituents)). Preferably, the left end of each of -$L^{31}$-O— and -$L^{33}$-S— is bound to A, whereas the right end thereof is bound to the $CF_2$ group.

The method comprises polymerizing a monomer comprising a compound represented by the following formula (4):

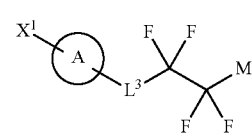

(wherein
$X^1$ is a halogen atom selected from the group consisting of a chlorine atom, a bromine atom, and an iodine atom;
M is a metal selected from the group consisting of copper, zinc, nickel, iron, cobalt, and tin; and
A and $L^3$ are as defined above); and
a ligand selected from the group consisting of compounds having a pyridine ring, and phosphines.

In formulas (3) and (4), A is preferably a $C_{6-10}$ arylene group optionally having one or more substituents, or a 5- to 10-membered heteroarylene group optionally having one or more substituents.

A is more preferably a group optionally having one or more substituents and selected from the group consisting of a phenylene group, a furan-diyl group, an oxazole-diyl group, an isoxazole-diyl group, an oxadiazole-diyl group, a thiophene-diyl group, a thiazole-diyl group, an isothiazole-diyl group, a thiadiazole-diyl group, a pyrrole-diyl group, a pyrazole-diyl group, an imidazole-diyl group, a triazole-diyl group, a pyridine-diyl group, a pyridazine-diyl group, a pyrimidine-diyl group, a pyrazine-diyl group, a triazine-diyl group, or a tetrazine-diyl group.

A is also preferably a phenylene group optionally having one or more substituents. A 1,3-phenylene group optionally having one or more substituents or a 1,4-phenylene group optionally having one or more substituents is also preferable.

Preferable examples of the substituents include a halogen atom, an amino group, an alkyl group, a monoalkylamino group, a dialkylamino group, and a haloalkyl group; more preferably a halogen atom, an amino group, a $C_{1-6}$ alkyl group, a mono-$C_{1-6}$ alkylamino group, a di-$C_{1-6}$ alkylamino group, and a halo-$C_{1-6}$ alkyl group; and particularly preferably a fluorine atom, a chlorine atom, an amino group, a $C_{1-4}$ alkyl group, a mono-$C_{1-4}$ alkylamino group, a di-$C_{1-4}$ alkylamino group, and a perfluoro-$C_{1-2}$ alkyl group.

$L^{31}$ to $L^{34}$ are each preferably a $C_{1-6}$ alkylene group, and is more preferably a $C_{1-4}$ alkylene group.

In formulas (3) and (4), $L^3$ is preferably a single bond, an oxygen atom, -$L^{31}$-O—, or —O$L^{32}$-O—.

In formula (4), M usually forms a coordination bond with the ligand. M is preferably copper, and more preferably copper (I).

Examples of the "compound having a pyridine ring" as a ligand include phenanthroline (e.g., 1,10-phenanthroline), 2,2'-bipyridyl, pyridine, methylpyridine, and lutidine (e.g., 2,6-lutidine).

Preferable examples of the "phosphines" as a ligand include trialkylphosphines and triarylphosphines. Specific examples of trialkylphosphines include tri($C_{3-20}$ alkyl)phosphines such as tricyclohexylphosphine, triisopropylphosphine, tri-t-butylphosphine, trihexylphosphine, triadamantylphosphine, tricyclopentylphosphine, di-t-butylmethylphosphine, tribicyclo[2,2,2]octylphosphine, and trinorbornylphosphine.

Specific examples of triarylphosphines include tri(monocyclic aryl)phosphines, such as triphenylphosphine, trimesitylphosphine, and tri(o-tolyl)phosphine. Among these, triphenylphosphine, tricyclohexylphosphine, and tri-t-butylphosphine are preferable.

The ligand is preferably a bidentate ligand.

Preferable examples include 1,10-phenanthroline.

The number of ligands coordinated to the monomer varies depending on, for example, the oxidation number of metal M and the number of coordinating atoms of the ligand; and is preferably one to three.

The monomer can be prepared by a known method, for example, a method comprising reacting an organoboron compound, such as a boronic acid having a moiety represented by the following formula (5):

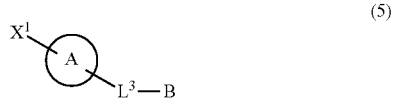

(5)

(wherein $X^1$, A, and $L^3$ are as defined above), an ester of boronic acid, a salt of boronic acid, or a salt of an ester of boronic acid, with a ligand and tetrafluoroethylene, the ligand being selected from the group consisting of metal compounds that are hydroxides, halides, alkoxides, aryl oxides, thioalkoxides, or thioaryloxides of metal M; compounds having a pyridine ring; and phosphine.

The method may be, for example, the method disclosed in WO2015/050236.

The monomer may be isolated or purified by a conventional method. The monomer can also be used for polymerization without being subjected to isolation or purification.

The polymerization of the monomer is preferably performed in the presence of a solvent.

Examples of the solvent include, but are not limited to, hydrocarbons (e.g., aliphatic hydrocarbons such as hexane, and aromatic hydrocarbons such as toluene and xylene), ethers (e.g., chain ethers such as diethyl ether, and cyclic ethers such as tetrahydrofuran and dioxane), and ketones (e.g., chain ketones such as acetone, and cyclic ketones such as cyclohexanone). Two or more of such solvents can be mixed and used. The solvent is preferably an ether solvent, and more preferably a cyclic ether solvent.

For example, heating can advance the polymerization of the monomer. As long as the polymerization proceeds, the polymerization temperature of the monomer is not particularly limited. For example, the polymerization temperature is in the range of 20 to 200° C., and preferably 50 to 150° C.

The polymerization time of the monomer is not particularly limited; and is, for example, in the range of 0.5 to 60 hours, and preferably 2 to 24 hours.

The polymer obtained by polymerizing the monomer may be washed and dried or purified by conventional methods. Examples of the washing solvent include, but are not limited to, water, concentrated nitric acid, hydrocarbons (e.g., hexane), alcohols (e.g., methanol and ethanol), and ketones (e.g., acetone and methyl ethyl ketone). Two or more of such solvents can be used in combination. In one embodiment, at least concentrated nitric acid is preferably used as the cleaning solvent.

Polymer Having Monomer Unit Represented by Formula (6)

The polymer according to another embodiment of the present disclosure is preferably a polymer having a monomer unit represented by the following formula (6):

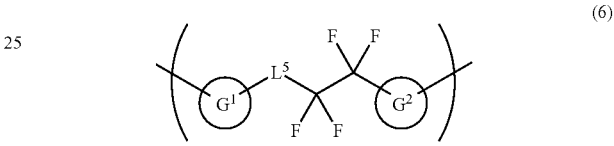

(6)

(wherein

G1 and G2 are each independently an arylene group optionally having one or more substituents, or a heteroarylene group optionally having one or more substituents; and $L^5$ is a single bond, an oxygen atom, a sulfur atom, -$L^{51}$-O—, —O-$L^{52}$-O—, -$L^{53}$-S—, or —S-$L^{54}$-S— (wherein $L^{51}$ to $L^{54}$ are each independently an alkylene group optionally having one or more substituents)). Preferably, the left end of each of -$L^{51}$-O— and -$L^{53}$-S— is bound to $G^1$, whereas the right end thereof is bound to the $CF_2$ group.

In formula (6), $G^1$ and $G^2$ are each preferably a $C_{6-10}$ arylene group optionally having one or more substituents, or a 5- to 10-membered heteroarylene group optionally having one or more substituents.

$G^1$ and $G^2$ are each preferably a phenylene group, a furan-diyl group, an oxazole-diyl group, an isoxazole-diyl group, an oxadiazole-diyl group, a thiophene-diyl group, a thiazole-diyl group, an isothiazole-diyl group, a thiadiazole-diyl group, a pyrrole-diyl group, a pyrazole-diyl group, an imidazole-diyl group, a triazole-diyl group, a pyridine-diyl group, a pyridazine-diyl group, a pyrimidine-diyl group, a pyrazine-diyl group, a triazine-diyl group, or a tetrazine-diyl group.

$G^1$ and $G^2$ are each also preferably a phenylene group optionally having one or more substituents, a 1,3-phenylene group optionally having one or more substituents, or a 1,4-phenylene group optionally having one or more substituents.

The substituent is preferably a halogen atom, an amino group, an alkyl group, a monoalkylamino group, a dialkylamino group, or a haloalkyl group, and more preferably a halogen atom, an amino group, a $C_{1-6}$ alkyl group, a mono-$C_{1-6}$ alkylamino group, a di-$C_{1-6}$ alkylamino group, or a halo-$C_{1-6}$ alkyl group, and particularly preferably a fluorine atom, a chlorine atom, an amino group, a $C_{1-4}$ alkyl group, a mono-$C_{1-4}$ alkylamino group, a di-$C_{1-4}$ alkylamino group, or a perfluoro-$C_{1-2}$ alkyl group. When the substituent is a halogen atom, the unit represented by formula (6) can be further linked via the substituent.

$L^{51}$ to $L^{54}$ are each preferably a $C_{1-6}$ alkylene group, and more preferably a $C_{1-4}$ alkylene group.

$L^5$ is preferably a single bond, an oxygen atom, $-L^{51}$-O—, or —O-$L^{52}$-O—.

The monomer unit represented by formula (6) is preferably a monomer unit represented by the following formula (7):

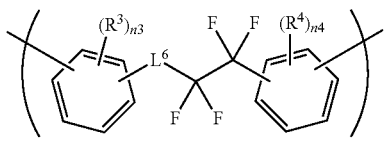

(wherein
$R^3$ and $R^4$ in each occurrence are independently a halogen atom, $NR^{31}R^{32}$ (wherein $R^{31}$ and $R^{32}$ are independently a hydrogen atom or an organic group), or an organic group; n3 and n4 are each independently an integer of 0 to 4; two $R^3$s or $R^4$s that can be present in the ortho positions may form a ring together with two carbon atoms on the adjacent benzene ring, wherein the formed ring may have an organic group as a substituent; and
$L^6$ is a single bond, an oxygen atom, a sulfur atom, -$L^{61}$-O—, —O-$L^{62}$-O—, -$L^{63}$-S—, or —S-$L^{64}$-S— (wherein $L^{61}$ to $L^{64}$ are each independently an alkylene group optionally having one or more substituents)).

$R^3$ and $R^4$ are each preferably a halogen atom, an amino group, an alkyl group, a monoalkylamino group, a dialkylamino group, or a haloalkyl group; more preferably a halogen atom, an amino group, $C_{1-10}$ alkyl groups, a mono-$C_{1-10}$ alkylamino group, a di-$C_{1-10}$ alkylamino group, or a halo-$C_{1-10}$ alkyl group, and particularly preferably a fluorine atom, a chlorine atom, an amino group, a $C_{1-6}$ alkyl group, a mono-$C_{1-6}$ alkylamino group, a di-$C_{1-6}$ alkylamino group, or a halo-$C_{1-6}$ alkyl group.

n3 and n4 are each preferably 0, 1, or 2; more preferably 0 or 1; and particularly preferably 0.

$L^{61}$ to $L^{64}$ are each preferably a $C_{1-6}$ alkylene group, and more preferably a $C_{1-4}$ alkylene group.

$L^6$ is preferably a single bond, an oxygen atom, -$L^{61}$-O—, or —O-$L^{62}$-O—.

$L^6$ is preferably a single bond, an oxygen atom, -$L^{61}$-O—, or —O-$L^{62}$-O—.

When two $R^3$s or $R^4$s that are present in the ortho-positions form a ring together with two carbon atoms on the adjacent benzene ring, specific examples of the formed ring include aromatic fused rings. Examples thereof include naphthalene, indole, benzimidazole, benzofuran, benzothiophene, quinoline, isoquinoline, quinazoline, phthalazine, and benzotriazole.

The ring may have one or more substituents. The substituent is preferably a halogen atom, an amino group, an alkyl group, a monoalkylamino group, a dialkylamino group, or a haloalkyl group; more preferably a halogen atom, an amino group, a $C_{1-6}$ alkyl group, a mono-$C_{1-6}$ alkylamino group, a di-$C_{1-6}$ alkylamino group, or a halo-$C_{1-6}$ alkyl group; and particularly preferably a fluorine atom, a chlorine atom, an amino group, a $C_{1-4}$ alkyl group, a mono-$C_{1-4}$ alkylamino group, a di-$C_{1-4}$ alkylamino group, or a perfluoro-$C_{1-2}$ alkyl group.

In two or more repetitions of a monomer unit represented by formula (6), the right end of one unit may be bound to either the left or right end of another unit. That is, the polymer having a monomer unit represented by formula (6) may have a unit represented by formula (6A) or a unit represented by formula (6B):

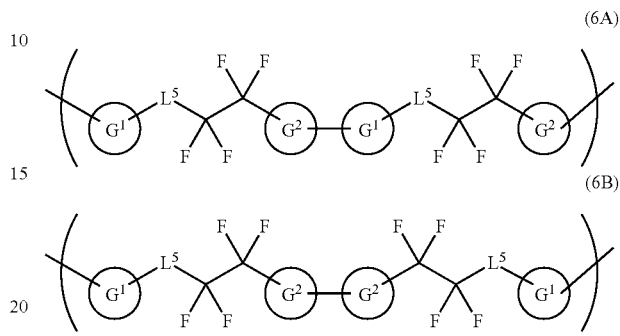

(wherein $G^1$, $G^2$, and $L^5$ are as defined above), or may have both of the units represented by formulas (6A) and (6B).

The polymer having the monomer unit represented by formula (6) can be a homopolymer or a copolymer.

The copolymer may be a copolymer having two or more kinds of monomer units represented by formula (6).

The polymer having a monomer unit represented by formula (6) can be in a linear or branched (e.g., star-shaped, comb-shaped) form.

The form of the copolymer having a monomer unit represented by formula (6) can be, for example, a random copolymer, an alternating copolymer, a block copolymer, or a graft copolymer.

The polymer having a monomer unit represented by formula (6) preferably has no peak in the temperature range of 300 to 350° C. in the DSC. Due to such low crystallinity, good processability can be obtained.

The polymer having a monomer unit represented by formula (6) can have a temperature of 5% mass loss in the range of 510 to 530, as determined by, for example, thermogravimetric measurement at a temperature-increasing rate of 10° C./min.

The glass transition temperature (Tg) of the polymer having a monomer unit represented by formula (6) is not particularly limited; and can be, for example, in the range of 500 to 550° C.

Method for Producing Polymer Having Monomer Unit Represented by Formula (6)

The method for producing a polymer according to an embodiment of the present disclosure is a method comprising subjecting to coupling polymerization a monomer represented by the following formula (8):

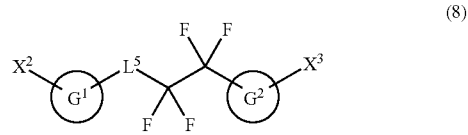

(wherein $X^2$ and $X^3$ are independently a halogen atom, and $G^1$, $G^2$, and $L^3$ are as defined above).

In formula (8), $X^2$ and $X^3$ are each preferably a fluorine atom, a chlorine atom, or a bromine atom.

The monomer represented by formula (8) can be produced, for example, by reacting a compound represented by the following formula (9):

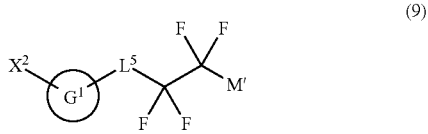

(9)

(wherein M' is a metal selected from the group consisting of copper, zinc, nickel, iron, cobalt, and tin; and $G^1$, $L^5$, and $X^2$ are as defined above) with a compound represented by the following formula (10):

(10)

(wherein $X^4$ is a halogen atom, and $G^3$ and $X^3$ are as defined above).

In formula (9), M' can be the same metal as M in formula (4). Preferable examples of M' are also the same as those of M. M' usually forms a coordinate bond with a ligand in the same manner as M.

In formula (10), $X^4$ is preferably a fluorine atom, a chlorine atom, a bromine atom, or an iodine atom. The combination of $X^3$ and $X^4$ is preferably a combination of a bromine atom and an iodine atom.

The lower limit of the amount of the compound represented by formula (9) can be, for example, 0.5 mol, 0.8 mol, or 1 mol, per mol of the compound represented by formula (10).

The upper limit of the amount of the compound represented by formula (9) can be, for example, 5 mol, 3 mol, 2 mol, or 1.5 mol, per mol of the compound represented by formula (10).

The amount of the compound represented by formula (9) can be, for example, in the range of 0.5 to 1.5 mol per mol of the compound of formula (10).

The reaction is preferably performed in the presence of a solvent.

Examples of the solvent include, but are not limited to, hydrocarbons (e.g., aliphatic hydrocarbons such as hexane, and aromatic hydrocarbons such as toluene and xylene), ethers (e.g., chain ethers such as diethyl ether, and cyclic ethers such as tetrahydrofuran and dioxane), ketones (e.g., chain ketones such as acetone, and cyclic ketones such as cyclohexanone). Two or more of such solvents can be used as a mixture. The solvent is preferably an ether solvent, and is more preferably a cyclic ether solvent.

For example, heating can advance the reaction. As long as the reaction advances, the reaction is not particularly limited. For example, the reaction temperature is in the range of 20 to 200° C., and preferably 50 to 150° C.

The reaction time is not particularly limited; and is, for example, in the range of 0.5 to 60 hours, and preferably 2 to 24 hours.

The coupling polymerization is preferably performed in the presence of a transition metal catalyst, and more preferably in the presence of at least one selected from the group consisting of nickel catalysts, palladium catalysts, and cobalt catalysts.

Examples of nickel catalysts include zerovalent nickel complexes; zerovalent nickel complexes generated from divalent nickel complexes during a reaction; and complexes obtained by mixing these nickel complexes with at least one compound (ligand) selected from the group consisting of ketones, diketones, phosphines, diamines, bipyridines, cycloalkadienes, and phenanthrolines.

Examples of ketones include, but are not limited to, dibenzylideneacetone and the like.

Examples of the diketone include, but are not limited to, S-diketones such as acetylacetone, 1-phenyl-1,3-butandione, 1,3-diphenylpropanedione, and hexafluoroacetylacetone.

Examples of the phosphines include, but are not limited to, phosphines that are mentioned above as examples in the step of polymerizing a monomer containing a compound represented by formula (4); and the like.

Examples of the diamine include, but are not limited to, tetramethylethylenediamine, 1,2-diphenylethylenediamine, and the like.

Examples of the bipyridine include, but are not limited to, 2,2'-bipyridyl, 4,4'-dimethyl-2,2'-bipyridyl, 5,5'-dimethyl-2,2'-bipyridyl, 6,6'-dimethyl-2,2'-bipyridyl, 4,4'-di-tert-butyl-2,2'-bipyridine, 4,4'-dimethoxy-2,2'-bipyridyl, 2,2'-biquinoline, and $\alpha,\alpha',\alpha''$-tripyridyl, and the like.

Examples of the cyclooctadiene include, but are not limited to, cyclopentadiene, cyclooctadiene, cyclodecadiene, and the like.

Examples of the phenanthroline include, but are not limited to, 1,10-phenanthroline, 2-methyl-1,10-phenanthroline, 3-methyl-1,10-phenanthroline, 5-methyl-1,10-phenanthroline, 2,9-dimethyl-1,10-phenanthroline, 2,9-diphenyl-1,10-phenanthroline, 4,7-dimethyl-1,10-phenanthroline, 5,6-dimethyl-1,10-phenanthroline, 4,7-diphenyl-1,10-phenanthroline, 2,9-dimethyl-4,7-diphenyl-1,10-phenanthroline, 3,4,7,8-tetramethyl-1,10-phenanthroline, and the like.

Examples of zerovalent nickel complexes include, but are not limited to, $Ni(cod)_2$, $Ni(cdd)_2$ (wherein cdd is cyclodeca-1,5-diene), $Ni(cdt)_2$ (wherein cdt is cyclodeca-1,5,9-triene), $Ni(vch)_2$ (wherein vch is 4-vinylcyclohexene), $Ni(CO)_4$, $(PCy_3)_2Ni-N\equiv N-Ni(PCy_3)_2$, $Ni(PPh_3)_4$, and the like.

Examples of divalent nickel complexes include nickel chloride, nickel bromide, nickel acetate, bis(acetylacetonato)nickel(II), and complexes obtained by coordinating a phosphine ligand, such as triphenylphosphine, to these complexes. These divalent nickel complexes are, for example, reduced by a reducing species (e.g., phosphines, zinc, or an organic metal reagent) that is co-present during a reaction, thereby generating zerovalent nickel complexes.

The zerovalent nickel complexes or zerovalent nickel complexes generated from divalent nickel complexes through reduction can interact with a ligand that is optionally added during a reaction, and can be converted to zerovalent nickel complexes that are involved in the reaction. The number of ligands coordinated to a zerovalent nickel complex during the reaction is not always clear.

Examples of palladium complexes include zerovalent palladium complexes; zerovalent palladium complexes generated from divalent palladium complexes during a reaction; and complexes obtained by mixing these palladium complexes with at least one compound (ligand) selected from the group consisting of ketones, diketones, phosphines, diamines, bipyridines, cycloalkadienes, and phenanthrolines. Examples of the ketone, diketone, phosphine, diamine, bipyridine, cycloalkadiene, and phenanthroline are the same as those exemplified for the nickel catalyst.

Examples of zerovalent palladium complexes include, but are not limited to, Pd$_2$(dba)$_3$ (wherein dba represents dibenzylideneacetone), Pd$_2$(dba)$_3$-CHCl$_3$, Pd(dba)$_2$, Pd(cod)$_2$ (wherein cod represents cycloocta-1,5-diene), Pd(dppe)$_2$ (wherein dppe represents 1,2-bis (diphenylphosphino) ethane), Pd(PCy$_3$)$_2$ (wherein Cy represents a cyclohexyl group), Pd(Pt-Bu$_3$)$_2$ (wherein t-Bu represents a t-butyl group), Pd(PPh$_3$)$_4$ (wherein Ph represents a phenyl group), tris{tris[3,5-bis(trifluoromethyl)phenyl]phosphine}palladium (0), and the like.

Examples of monovalent palladium complexes include di-μ-chlorobis(tri-tert-butylphosphine)dipalladium (I), di-μ-bromobis(tri-tert-butylphosphine)dipalladium (I), di-μ-iodobis(tri-tert-butylphosphine)dipalladium (I), di-μ-chlorobis{tri(1-adamantyl)phosphine}dipalladium (I), di-μ-bromobis{tri(1-adamantyl)phosphine}dipalladium (I), di-μ-iodobis{tri(1-adamantyl)phosphine}dipalladium (I), and the like.

Examples of divalent palladium complexes include palladium chloride, palladium bromide, palladium acetate, bis(acetylacetonato)palladium(II), dichloro (η$^4$-1,5-cyclooctadiene)palladium(II), dibromo(η$^4$-1,5-cyclooctadiene)palladium (II), bis(acetonitrile)dichlcropalladium (II), bis(benzonitrile)dichloropalladium (II), and di-μ-chlorobis{(η-allyl)palladium} (II); and complexes in which a phosphine ligand, such as triphenylphosphine, is coordinated to these palladium complexes.

By using a ligand as described above, the nickel complexes, palladium complexes, and the like are often formed into a homogeneous solution with a reaction substrate, and used in the reaction. In addition, these complexes can also be used as a heterogeneous catalyst dispersed in or supported on a polymer, such as polystyrene or polyethylene. Such heterogeneous catalysts have process advantages, such as catalyst recovery. Specific examples of catalyst structures include those in which a metal atom is immobilized by a polymeric phosphine that comprises a phosphine introduced into a crosslinked polystyrene (PS) chain, as shown in the chemical formula below. In addition, the polymeric phosphines disclosed in the following documents can also be used.

1) Kanbara et al., Macromolecules, 2000, volume 33, page 657
2) Yamamoto et al., J. Polym. Sci., 2002, volume 40, page 2637
3) JPH06-032763A
4) JP2005-281454A
5) JP2009-527352A

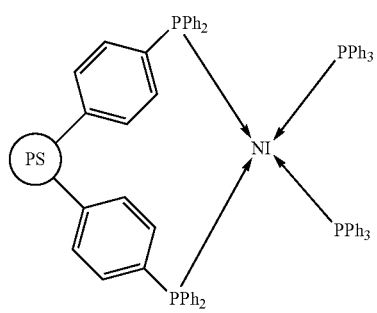

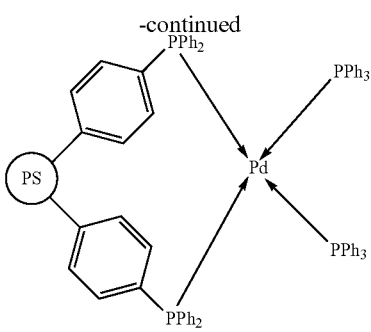

(wherein PS represents polystyrene and Ph represents phenyl).

Examples of cobalt catalysts include (Cl)Co(PPh$_3$)$_3$, (C$_5$H$_5$)$_2$Co(PPh$_3$)$_2$ (wherein C$_5$H$_5$ is a cyclopentadienyl group), (C$_5$H$_5$)$_2$Co(cod)$_2$, tris(acetylacetonato) cobalt (III), cobalt (II) chloride, and complexes in which a phosphine ligand, such as triphenylphosphine, is coordinated to these complexes.

The ligand/catalyst molar ratio is, for example, in the range of 0.5 to 10, 1 to 10, 1 to 8, 1 to 6, 1 to 4, or 1 to 2.

Such catalysts can be used singly, or in a combination of two or more. In one embodiment, the catalyst is preferably a nickel catalyst.

The upper limit of the amount of the catalyst can be preferably 1.2 moles, more preferably 1.1 moles, and even more preferably 1 mole, per mole of the monomer.

The lower limit of the amount of the catalyst can be preferably 0.01 moles, more preferably 0.005 moles, and even more preferably 0.001 moles, per mole of the monomer.

The amount of the catalyst is preferably in the range of 0.001 to 1.2 moles, more preferably 0.005 to 1.1 moles, and even more preferably 0.01 to 1 mole, per mole of the monomer.

The coupling polymerization is preferably performed in the presence of a solvent. Examples of the solvent include aromatic hydrocarbons such as benzene, toluene and xylene; ethers such as cyclopentylmethyl ether, tetrahydrofuran, bis(2-methoxyethyl)ether, and 1,2-bis(2-methoxyethoxy)ethane; nitriles such as acetonitrile and propionitrile; ketones such as acetone, ethyl methyl ketone, and isobutyl methyl ketone; dialkyl sulfoxides such as dimethyl sulfoxide; and amides such as N,N-dimethylformamide, N,N-dimethylacetamide, and hexaalkylphosphate triamides (e.g., hexamethylphosphate amides).

These solvents can be used singly, or in a combination of two or more.

The temperature and time of the coupling polymerization are not particularly limited, as long as the coupling proceeds.

The temperature can be, for example, in the range of 10 to 150° C., and preferably 15 to 100° C.

The time can be, for example, in the range of 0.5 to 30 hours, and preferably 1 to 24 hours.

The polymer having a unit represented by formula (1), (1)', (3), or (6) can be used, for example, at a high temperature (e.g., 450° C. or less). In addition, the polymer has excellent ultraviolet resistance, and can be used under severe conditions for a long period of time. Further, the polymer has a low coefficient of friction and a low dielectric constant, and is also excellent in terms of gap penetration ability.

Specific examples of applications of polymers having a unit represented by formulas (1), (1)', (3), or (6) include coatings. Examples of coatings are coatings for medical equipment (e.g., stents, cardiac aids, electrosurgical tools, cochlear implants, intraocular implants, mandrel, moldings, catheters, elastomer seals, needles, epidural probes, and electronic equipment for medical use), coatings for electronics (e.g., printed circuit boards, assemblies, sensors, MEMS (microelectromechanical systems), capacitors, wafers, ferrite cores, displays, and metal parts), coatings for LED (e.g., displays, lightning bulletin boards, traffic signals, scoreboards, marine lights, consumer refrigerators, vehicle lights, and outdoor lighting), coatings for automotive parts (e.g., sensors, tire pressure monitoring systems, fuel cell technology, gaskets, and seals), and coatings for defense or aerospace industry equipment (e.g., MEMS, sensors, circuit card assemblies, motor components, power supplies, backplanes, and elastomer components).

Further, the polymer having a unit represented by formula (1), (1)', (3), or (6) can also be used, for example, as a sealing material, a vibrating film, or an insulating film (e.g., a semiconductor interlayer insulating film).

Film

The film according to one embodiment of the present disclosure contains a polymer having a unit represented by formula (1), (1)', (3), or (6).

The content of the polymer having a unit represented by formula (1), (1)', (3), or (6) in the film is not particularly limited; and is, for example, in the range of 70 mass % or more, preferably 80 mass % or more, and more preferably 90 mass % or more.

The film may contain one or more additives in addition to the polymer having a unit represented by formula (1), (1)', (3), or (6). Examples of such additives include colorants, plasticizers, antioxidants, ultraviolet absorbers, fillers, flame retardants, antistatic agents, antibacterial agents, and a combination of two or more of these.

The thickness of the film is an arithmetic mean value of thicknesses measured at 10 points on the film selected in a non-arbitrary manner.

The lower limit of the thickness of the film can be, for example, 0.2 µm, 2 µm, or 10 µm.

The upper limit of the thickness of the film can be, for example, 200 µm, 150 µm, or 100 µm.

The thickness of the film can be, for example, in the range of 0.2 to 200 µm, 2 to 150 µm, or 10 to 100 µm.

The film has the physical properties of a polymer having a unit represented by formula (1), (1)', (3), or (6); and also has, for example, excellent transparency.

The method for producing the film comprises applying a predetermined pressure to a polymer having a monomer unit represented by, for example, formula (1), (1)', (3), or (6).

EXAMPLES

One embodiment of the present disclosure will be described in more detail with reference to Examples; however, the disclosure is not limited thereto.

The symbols in the Examples have the following meanings.

$^{t}$Bu: tert-Butyl
Ph: Phenylene
Phen: Phenanthroline
TFE: Tetrafluoroethylene
bpy: bipyridine
COD: 1,5-Cyclooctadiene Example 1-1: Synthesis of Homopolymer of p-PhCF$_2$CF$_2$ 1. Synthesis of p-BrPhCF$_2$CF$_2$Cu (phen)

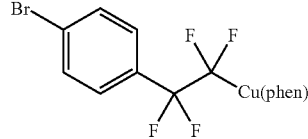

In a glove box, 5,5-dimethyl-2-(4-bromophenyl)-1,3,2-dioxaborinane (592 mg, 2.2 mmol), CuO$^{t}$Bu (267 mg, 2.0 mmol), and 1,10-phenanthroline (phen: 360 mg, 2.0 mmol) were mixed in 20 mL of THF solvent, followed by stirring at room temperature for 30 minutes, thus preparing p-BrPhCu (phen). The solution was placed in a pressure-resistant container, and TFE was pressurized to 3.5 atm, followed by heating at 40° C. for 15 hours. The unreacted TFE was degassed, followed by concentration and washing with hexane, thereby giving a complex compound: p-BrPhCF$_2$CF$_2$Cu (phen) as a brownish solid (880.47 mg).

$^1$H NMR (400 MHz, C$_6$D$_6$, rt, δ/ppm): 6.71 (br, Ar), 6.95 (br, Ar), 7.24 (br, phen), 7.36 (br, phen), 7.91 (br, phen), 8.68 (br, phen).

$^{19}$F NMR (400 MHz, C$_6$D$_6$, rt, δ/ppm): −107.9 (br, 2F), −106.5 (br, 2F)

2. Synthesis of Homopolymer of p-PhCF$_2$CF$_2$

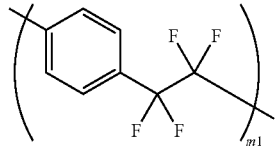

In the formula, m1 is an integer of 2 or more.

In a glove box, the THF solution (0.3 mL) of p-BrPhCF$_2$CF$_2$Cu (phen) (15 mg, 0.03 mmol) was added to an autoclave (50 mL), followed by heating and stirring at 100° C. for 24 hours. The product was washed with methanol, acetone, and water in this order; and vacuum-dried, thereby giving a polymer: homopolymer of p-PhCF$_2$CF$_2$ as a white solid (2.9 mg).

Tg: 519° C.

IR peak: 1202 cm$^{-1}$, 1146 cm$^{-1}$, 637 cm$^{-1}$

Solid $^1$H NMR (700 MHz, neat, rt, δ/ppm): 0.071 (br), 0.80 (br), 1.20 (br), 6.75 (br)

Solid $^{19}$F NMR (700 MHz, neat, rt, δ/ppm): −122.56 (br)

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p-PhCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 1-2: Synthesis of Homopolymer of p-PhCF$_2$CF$_2$

The same operation was performed as in Example 1-1, except that the product was washed with methanol, acetone, concentrated nitric acid, and acetone in this order in Example 1-1-2, thus obtaining a homopolymer of p-PhCF$_2$CF$_2$.

Example 2-1: Synthesis of Homopolymer of m-PhCF$_2$CF$_2$

1. Synthesis of m-BrPhCF$_2$CF$_2$Cu (phen)

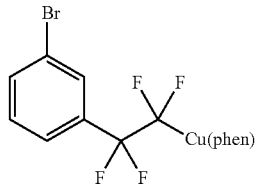

In a glove box, 5,5-dimethyl-2-(3-bromophenyl)-1,3,2-dioxaborinane (592 mg, 2.2 mmol), CuO$^t$Bu (267 mg, 2.0 mmol), and 1,10-phenanthroline (phen: 360 mg, 2.0 mmol) were mixed in 20 mL of THF solvent, followed by stirring at room temperature for 30 minutes, thus preparing m-BrPhCu (phen). The solution was placed in a pressure-resistant container, and TFE was pressurized to 3.5 atm, followed by heating at 40° C. for 15 hours. The unreacted TFE was degassed, followed by concentration and washing with hexane, thereby giving a complex compound: m-BrPhCF$_2$CF$_2$Cu (phen) as a brownish solid (750.40 mg).

$^1$H NMR (400 MHz, C$_6$D$_6$, rt, δ/ppm): 6.77 (br, phen), 6.87 (t, Ar), 6.96 (br, Ar), 7.00 (br, phen), 7.29 (br, phen), 8.04 (d, Ar), 8.50 (br, Ar), 8.70 (br, phen).

$^{13}$F NMR (400 MHz, C$_6$D$_6$, rt, δ/ppm): −108.9 (br, 2F), −108.7 (br, 2F)

2. Synthesis of Homopolymer of m-PhCF$_2$CF$_2$

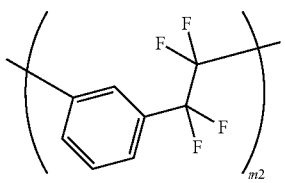

In the formula, m2 is an integer of 2 or more.

In a glove box, the THF solution (0.3 mL) of m-BrPhCF$_2$CF$_2$Cu (phen) (15 mg, 0.03 mmol) was added to an autoclave (50 mL), followed by heating and stirring at 100° C. for 24 hours. The product was washed with methanol, acetone, and water in this order; and vacuum-dried, thereby giving a polymer: homopolymer of m-PhCF$_2$CF$_2$ as a white solid (18.7 mg).

Tg: 518° C.
IR peak: 1210 cm$^{-1}$, 1150 cm$^{-1}$, 640 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was not observed at around 310 to 330° C. This indicates that the m-homopolymer of PhCF$_2$CF$_2$ does not have a melting point. Accordingly, the m-PhCF$_2$CF$_2$ homopolymer has good processability.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 2-2: Synthesis of Homopolymer of m-PhCF$_2$CF$_2$

The same operation was performed as in Example 2-1, except that the product was washed with methanol, acetone, concentrated nitric acid, and acetone in this order in Example 2-1-2, thus obtaining a homopolymer of p-PhCF$_2$CF$_2$.

Example 3: Synthesis of Copolymer of m-PhCF$_2$CF$_2$/p-PhCF$_2$CF$_2$

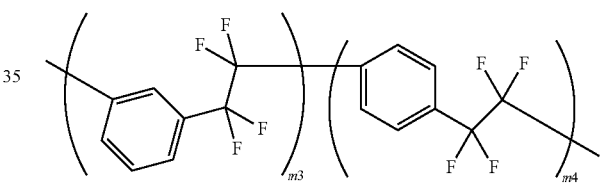

In the formula, m3 and m4 are the same or different, and each represents an integer of 1 or more.

In a glove box, the THF solution (0.3 mL) of m-BrPhCF$_2$CF$_2$Cu (phen) (7.5 mg, 0.015 mmol) and p-BrPhCF$_2$CF$_2$Cu (phen) (7.5 mg, 0.015 mmol) was added to an autoclave (50 mL), followed by heating and stirring at 100° C. for 24 hours. The product was washed with methanol, acetone, and water; and vacuum-dried, thereby giving a polymer: copolymer of m-PhCF$_2$CF$_2$/p-PhCF$_2$CF$_2$ as a white solid (3.47 mg).

IR peak: 1209 cm$^{-1}$, 1151 cm$^{-1}$, 641 cm$^{-1}$

Example 4-1: Synthesis of Homopolymer of p-PhOCF$_2$CF$_2$

1. Synthesis of p-BrPhOCF$_2$CF$_2$Cu (phen)

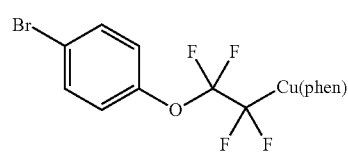

In a glove box, 4-bromophenol (103.8 mg, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing p-BrPhOCu (phen). The solution was placed in a pressure-resistant container, and TFE was pressurized to 3.5 atm, followed by heating at 40° C. for 15 hours. After the unreacted TFE was degassed, THF was added, and the insoluble solid was removed by filtration; and the filtrate was concentrated. Thereafter, washing with hexane was conducted, thereby giving a complex compound: p-BrPhOCF$_2$CF$_2$Cu (phen) (125.19 mg) as a brownish solid.

$^1$H NMR (400 MHz, C$_6$D$_6$, rt, δ/ppm): 6.70 (2H), 6.95 (4H), 7.24 (4H), 8.57 (2H)

$^{19}$F NMR (400 MHz, C$_6$D$_6$, rt, δ/ppm): −88.7 (br, 2F), −111.4 (br, 2F)

$^{13}$C NMR (400 MHz, THF, rt, δ/ppm): 115.07, 121.79 (Ar), 123.43, 124.93, 127.24, 129.9 (Ar), 135.73, 141.95, 148.08, 149.06.

2. Synthesis of Homopolymer of p-PhOCF$_2$CF$_2$

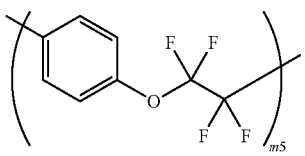

In the formula, m5 is an integer of 2 or more.

In a glove box, the THF solution (0.3 mL) of p-BrPhOCF$_2$CF$_2$Cu (phen) (15.47 mg, 0.03 mmol) was added to an autoclave (50 mL), followed by heating and stirring at 100° C. for 24 hours. The product was washed with methanol, acetone, and water in this order; and vacuum-dried, thereby giving a polymer: homopolymer of p-PhOCF$_2$CF$_2$ as a white solid (3.27 mg).

IR peak: 1205 cm$^{-1}$, 1146 cm$^{-1}$, 639 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p-PhOCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 4-2: Synthesis of Homopolymer of p-PhOCF$_2$CF$_2$

The same operation was performed as in Example 4-1, except that after TFE was pressurized to 3.5 atm, heating was performed at 40° C. for 24 hours; after the unreacted TFE was degassed, concentration and washing with ether were performed in Example 4-1-1; and the product was washed with methanol, acetone, concentrated nitric acid, and acetone in this order in Example 4-1-2, thereby giving a homopolymer of p-PhOCF$_2$CF$_2$.

Example 5: Film Production

By applying pressure using a mortar to the powder of the homopolymer of m-PhCF$_2$CF$_2$ obtained in Example 2, a transparent film was obtained.

Example 6: Synthesis of Homopolymer of m-PhOCF$_2$CF$_2$

1. Synthesis of m-BrPhOCF$_2$CF$_2$Cu (phen)

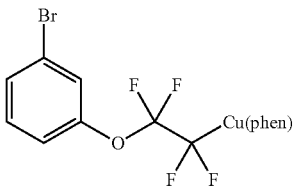

In a glove box, 3-bromophenol (103.8 mg, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing m-BrPhOCu (phen). The solution was placed in a pressure-resistant container, and TFE was pressurized to 3.5 atm, followed by heating at 40° C. for 24 hours. The unreacted TFE was degassed, concentrated, and washed with ether, thereby giving a complex compound: m-BrPhOCF$_2$CF$_2$Cu (phen) as a brownish solid (168.95 mg).

$^1$H NMR (400 MHz, C$_6$D$_6$, rt, δ/ppm): 6.54 (br, Ar), 6.80 (br, Ar), 7.06 (br, phen), 7.37 (br, phen), 7.79 (br, phen), 8.48 (br, phen).

$^{13}$F NMR (400 MHz, C$_6$D$_6$, rt, δ/ppm): −88.7 (br, 2F), −111.3 (br, 2F) (ionic: −90.0 (br, 2F), −116.7 (br, 2F))

2. Synthesis of Homopolymer of m-PhOCF$_2$CF$_2$

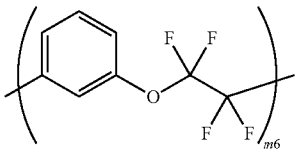

In the formula, m6 is an integer of 2 or more.

In a glove box, the THF solution (0.3 mL) of m-BrPhOCF$_2$ CF$_2$Cu (phen) (15.47 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thus giving a polymer: homopolymer of m-PhOCF$_2$CF$_2$ as a white solid (5.39 mg).

IR peak: 1211 cm$^{-1}$, 1153 cm$^{-1}$, 643 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of m-PhOCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 7: Film Production

By applying pressure using a mortar to the powder of the homopolymer of m-PhOCF$_2$CF$_2$ obtained in Example 6, a transparent film was obtained.

Example 8: Synthesis of Homopolymer of p(2-CH$_3$)C(H$_4$OCF$_2$CF$_2$

1. Synthesis of 4-Br, 2-CH$_3$CH$_6$OCF$_2$CF$_2$Cu (phen)

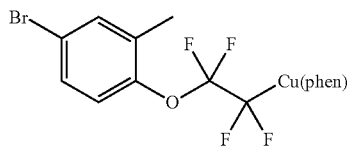

In a glove box, 4-bromo-2-methylphenol (112.00 mg, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing 4-Br,2-CH$_3$C$_6$H$_4$OCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: 4-Br,2-CH$_3$C$_6$H$_4$OCF$_2$CF$_2$Cu (phen) as a brownish solid (208.0 mg).

$^1$H NMR (400 MHz, C$_6$D$_6$, rt, δ/ppm): 6.69-7.35 (br, Ar), 8.56 (br, Ar).

$^{19}$F NMR (400 MHz, C$_6$D$_6$, rt, δ/ppm): −88.6 (br, 2F), −111.7 (br, 2F)

$^{13}$C NMR (400 MHz, THF, rt, δ/ppm): 15.71 (Me), 116.99, 123.71, 125.30, 126.82, 128.92, 129.16, 133.10, 134.09, 137.55, 143.82, 149.19, 149.88

2. Synthesis of Homopolymer of p(2-CH$_3$)C$_6$H$_4$OCF$_2$CF$_2$

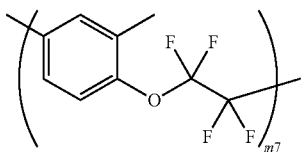

In the formula, m7 is an integer of 2 or more.

In a glove box, the THF solution (0.3 mL) of 4-Br,2-CH$_3$ C$_6$H$_4$OCF$_2$CF$_2$Cu (phen) (15.89 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thus giving a polymer: homopolymer of p(2-CH$_3$)C$_6$H$_4$OCF$_2$CF$_2$ as a white solid (5.08 mg).

IR peak: 1210 cm$^{-1}$, 1150 cm$^{-1}$, 636 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p(2-CH$_3$) C$_6$H$_4$OCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 9: Film Production

By applying pressure using a mortar to the powder of the homopolymer of p(2-CH$_3$)C$_6$H$_4$OCF$_2$CF$_2$ obtained in Example 8, a transparent film was obtained.

Example 10: Synthesis of Homopolymer of p(3-CH$_3$)C$_6$H$_4$OCF$_2$CF$_2$

1. Synthesis of 4-Br,3-CH$_3$C$_6$H$_4$OCF$_2$CF$_2$Cu (phen)

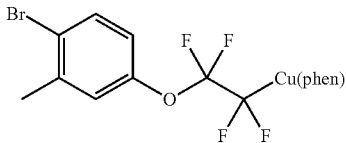

In a glove box, 4-bromo-3-methylphenol (112.00, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing 4-Br,3-CH$_3$C$_3$H$_4$OCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: 4-Br,3-CH$_3$C$_6$H$_4$OCF$_2$CF$_2$Cu (phen) as a brownish solid (232.6 mg).

$^1$H NMR (400 MHz, C$_6$D$_6$, rt, δ/ppm): 1H NMR (400 MHz, C$_6$D$_6$, rt, δ/ppm): 6.69-7.43 (br, Ar), 8.56 (br, Ar).

$^{19}$F NMR (400 MHz, C$_6$D$_6$, rt, δ/ppm): −87.8 (br, 2F), −110.9 (br, 2F)

$^{13}$C NMR (400 MHz, THF, rt, δ/ppm): 21.66, 119.21, 121.12, 124.26, 126.79, 129.11, 132.16, 137.56, 138.15, 143.81, 149.97, 150.96

2. Synthesis of Homopolymer of p(3-CH$_3$)C$_6$H$_4$OCF$_2$CF$_2$

In the formula, m8 is an integer of 2 or more.

In a glove box, the THF solution (0.3 mL) of 4-Br,3-CH$_3$C$_6$H$_4$OCF$_2$CF$_2$Cu (phen) (15.89 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thus giving a polymer: homopolymer of p(3-CH$_3$)C$_6$H$_4$OCF$_2$CF$_2$ as a white solid (3.50 mg).

IR peak: 1210 cm$^{-1}$, 1150 cm$^{-1}$, 637 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p(3-CH$_3$)C$_6$H$_4$OCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 11: Film Production

By applying pressure using a mortar to the powder of the homopolymer of p(3-CH$_3$)CH$_4$OCF$_2$CF$_2$ obtained in Example 10, a transparent film was obtained.

Example 12: Synthesis of Homopolymer of p(2-NH$_2$)PhOCF$_2$CF$_2$

1. Synthesis of 4-Br,2-NH$_2$PhOCF$_2$CF$_2$Cu (phen)

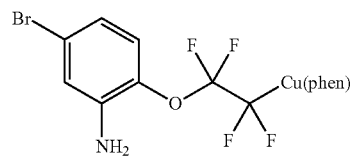

In a glove box, 4-buromo,2-aminophenol (56 mg, 0.30 mmol), CuMes (55 mg, 0.30 mmol), and 1,10-phenanthroline (phen: 54 mg, 0.3 mmol) were mixed in 10 mL of THF solvent, followed by stirring at room temperature for 30 minutes, thus preparing 4-Br,2-NH$_2$PhOCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: 4-Br,2-NH$_2$PhOCF$_2$CF$_2$Cu (phen) as a brownish solid (109.8 mg).

$^1$H NMR (400 MHz, THF-da, rt, δ/ppm): 4.70, 6.37, 6.59, 6.91, 7.95, 8.14, 8.68, 9.01

$^{19}$F NMR (400 MHz, THF-da, rt, δ/ppm): −92.0 (br, 2F), −141.4 (br, 2F)

2. Synthesis of Homopolymer of p(2-NH$_2$)PhOCF$_2$CF$_2$

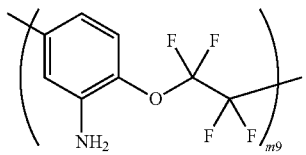

In the formula, m9 is an integer of 2 or more.

In a glove box, the THF solution (0.3 mL) of 4-Br,2-NH$_2$PhOCF$_2$CF$_2$Cu (phen) (15.9 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thereby giving a polymer: homopolymer of p(2-NH$_2$)PhOCF$_2$CF$_2$ as a white solid (13.2 mg).

IR peak: 1205 cm$^{-1}$, 1151 cm$^{-1}$, 640 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p(2-NH$_2$)PhOCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 13: Film Production

By applying pressure using a mortar to the powder of the homopolymer of p(2-NH$_2$)PhOCF$_2$CF, obtained in Example 12, a transparent film was obtained.

Example 14: Synthesis of Homopolymer of p(2-Cl)PhOCF$_2$CF$_2$

1. Synthesis of 4-Br,2-C$_1$PhOCF$_2$CF$_2$Cu (phen)

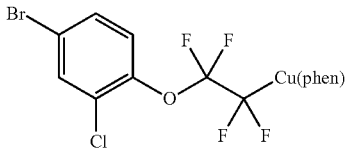

In a glove box, 4-bromophenol (103.8 mg, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing 4-Br,2-ClPhOCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: 4-Br,2-ClPhOCF$_2$CF$_2$Cu (phen) as a brownish solid (298.2 mg).

$^1$H NMR (400 MHz, THF-d$_8$, rt, δ/ppm): 7.26, 7.45, 7.62, 7.95, 8.14, 8.68, 9.04

$^{19}$F NMR (400 MHz, THF-d$_8$, rt, δ/ppm): −92.8 (br, 2F), −114.9 (br, 2F)

2. Synthesis of Homopolymer of p(2-Cl)PhOCF$_2$CF$_2$

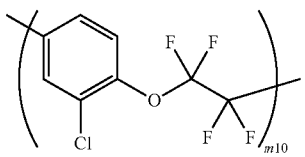

In the formula, m10 is an integer of 2 or more.

In a glove box, the THF solution (0.3 mL) of 4-Br,2-ClPhOCF$_2$CF$_2$Cu (phen) (16.5 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thereby giving a polymer: homopolymer of p(2-Cl)PhOCF$_2$CF$_2$ as a white solid (8.7 mg).

IR peak: 1207 cm$^{-1}$, 1151 cm$^{-1}$, 640 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p(2-Cl)PhOCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 15: Film Production

By applying pressure using a mortar to the powder of the homopolymer of p(2-Cl)PhOCF$_2$CF$_2$ obtained in Example 14, a transparent film was obtained.

Example 16: Synthesis of Homopolymer of p-(3-C$_5$H$_{11}$)PhOCF$_2$CF$_2$

1. Synthesis of 4-Br,3-C$_5$H$_{11}$PhOCF$_2$CF$_2$Cu (phen)

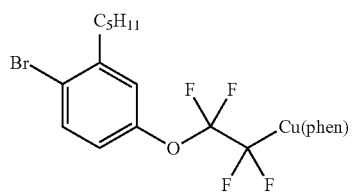

In a glove box, 4-Br,3-C$_5$H$_{11}$PhOH (243 mg, 1.0 mmol), CuMes (182 mg, 1.0 mmol), and 1,10-phenanthroline (phen: 180 mg, 1.0 mmol) were mixed in 10 mL of THF solvent, followed by stirring at room temperature for 30 minutes, thus preparing 4-Br, 3-C$_5$H$_{11}$ PhOCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: 4-Br,3-C$_5$H$_{11}$PhOCF$_2$CF$_2$Cu as a brownish solid (310.05 mg).

$^1$H NMR (400 MHz, C$_6$D$_6$, rt, δ/ppm): 6.71 (br, Ar), 8.86 (br, Ar), 7.24 (br, phen), 7.36 (br, phen), 7.91 (br, phen), 8.68 (br, phen).

$^{19}$F NMR (400 MHz, C$_6$D$_6$, rt, δ/ppm): −95.6 (br, 2F), −110.8 (br, 2F)

2. Synthesis of Homopolymer of p-(3-C$_5$H$_{11}$)PhOCF$_2$CF$_2$

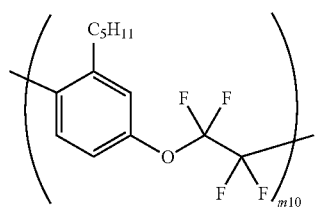

In the formula, m11 is an integer of 2 or more.

In a glove box, the THF solution (0.3 mL) of 4-Br,3-C$_5$H$_{11}$PhOCF$_2$CF$_2$Cu (phen) (17.6 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thereby giving a polymer: homopolymer of p-(3-C$_5$H$_{11}$)PhOCF$_2$ CF$_2$ as a white solid (2.05 mg).

IR peak: 1210 cm$^{-1}$, 1150 cm$^{-1}$, 636 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p-(3-C$_5$H$_{11}$)PhOCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 17: Film Production

By applying pressure using a mortar to the powder of the homopolymer of p-(3-C$_5$H$_{11}$)PhOCF$_2$CF$_2$ obtained in Example 16, a transparent film was obtained.

Example 18: Synthesis of Homopolymer of p-PhCH₂OCF₂CF₂

1. Synthesis of p-BrPhCH₂OCF₂CF₂Cu (phen)

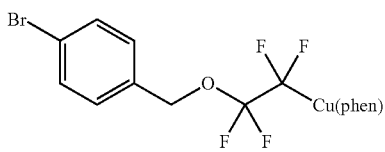

4-Bromobenzyl alcohol (111.6 mg, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing p-BrPhCH₂OCu (phen).

The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: p-BrPhCH₂OCF₂CF₂Cu (phen) as a brownish solid (182.14 mg).

$^1$H NMR (400 MHz, C$_6$D$_6$, rt, δ/ppm): 4.97 (s, CH$_2$), 6.71 (br, Ar), 7.00 (br, Ar), 7.13 (br, phen), 7.28 (br, phen), 7.46 (br, phen), 8.52 (br, phen).

$^{19}$F NMR (400 MHz, C$_6$D$_6$, rt, δ/ppm): −109.7 (br, 2F), −92.7 (br, 2F)

2. Synthesis of Homopolymer of p-PhCH₂OCF₂CF₂

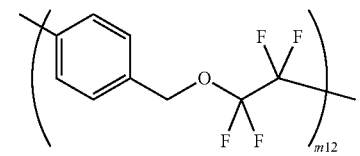

In the formula, m12 is an integer of 2 or more.

In a glove box, the THF solution (0.3 mL) of p-BrPhCH₂OCF₂CF₂Cu (phen) (15.8 mg, 0.03 mmol) was added to an autoclave (50 mL), followed by heating and stirring at 100° C. for 24 hours. The product was washed with methanol, acetone, and water in this order; and vacuum-dried, thereby giving a polymer: homopolymer of p-PhCH₂OCF₂CF as a white solid (5.00 mg).

FT-IR (ATR): $v_{CF}$ (cm$^{-1}$): 1202, 1147. $v_{CH}$ (cm$^{-1}$): 637.

Example 19: Film Production

By applying pressure using a mortar to the powder of the homopolymer of p-PhCH₂OCF₂CF₂ obtained in Example 18, a transparent film was obtained.

Example 20

Synthesis of 2-(4-BrPh)C₂H₄OCF₂CF₂Cu (phen)

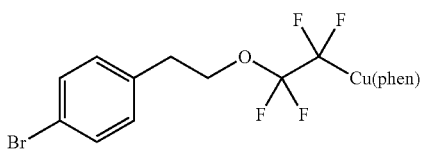

In a glove box, 2-(4-bromophenyl)ethylenealcohol (6.0 mg, 0.03 mmol), CuMes (5.5 mg, 0.03 mmol), and 1,10-phenanthroline (phen: 5.4 mg, 0.03 mmol) were mixed in 10 mL of THF solvent, followed by stirring at room temperature for 30 minutes, thus preparing 2-(4-BrPh)CH₂CH₂OCu (phen). The solution was placed in a pressure-resistant container, and TFE was pressurized to 3.5 atm, followed by heating at 40° C. for 24 hours, thereby giving a complex compound: 2-(4-BrPh)CH₂CH₂OCF₂CF₂Cu (phen) as a brownish solid (crude, $^{19}$F NMR yield 61%).

$^1$H NMR (400 MHz, C$_6$D$_6$, rt, δ/ppm): 2.16 (4H), 6.72 (2H), 6.74 (2H), 6.80 (2H), 7.00 (4H), 7.07 (2H), 7.40 (2H).

$^{13}$F NMR (400 MHz, C$_6$D$_6$, rt, δ/ppm): −93.4 (br, 2F), −110.0 (br, 2F)

Example 21: Synthesis of Homopolymer of pPhC₃H₆OCF₂CF₂

1. Synthesis of 2-(4-BrPh)C₃H₆OCF₂CF₂Cu (phen)

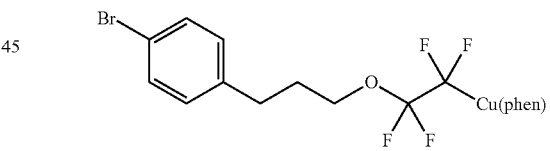

In a glove box, 4-bromophenol (103.8 mg, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing 2-(4-BrPh)C₃H₆OCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: 2-(4-BrPh)C₃H₆OCF₂CF₂Cu (phen) as a brownish solid (125.19 mg).

$^1$H NMR (400 MHz, THF, rt, δ/ppm): 1.88 (2H), 2.65 (2H), 3.88 (2H), 7.06 (2H), 7.29 (2H), 7.91 (2H), 8.70 (2H), 8.62 (2H), 9.03 (2H).

$^{19}$F NMR (400 MHz, THF, rt, δ/ppm): −95.2 (br, 2F), −111.7 (br, 2F)

2. Synthesis of Homopolymer of pPhC$_3$H$_6$OCF$_2$CF$_2$

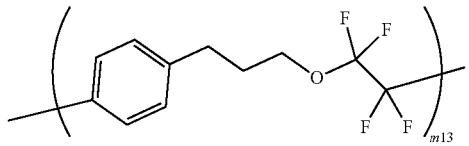

In the formula, m13 is an integer of 2 or more.

In a glove box, the THF solution (0.3 mL) of 2-(4-BrPh)C$_3$H$_6$OCF$_2$CF$_2$Cu (phen) (16.7 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thereby giving a polymer: homopolymer of pPhC$_3$H$_6$OCF$_2$CF$_2$ as a white solid (6.81 mg).

IR peak: 1198 cm$^{-1}$, 1144 cm$^{-1}$, 636 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of pPhC$_3$H$_6$OCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 22: Film Production

By applying pressure using a mortar to the powder of the homopolymer of pPhC$_3$H$_6$OCF$_2$CF$_2$ obtained in Example 21, a transparent film was obtained.

Example 23: Synthesis of Homopolymer of m(3-Br)PhOCF$_2$CF$_2$

1. Synthesis of Br$_2$PhOCF$_2$CF$_2$Cu (phen)

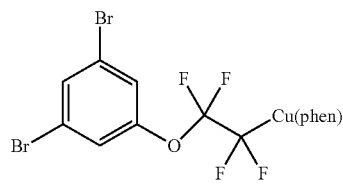

In a glove box, 3,5-dibromophenol (150.0 mg, 0.60 mmol), CuMes (91 mg, 0.50 mmol), and 1,10-phenanthroline (phen: 108 mg, 0.60 mmol) were mixed in 10 mL of THF solvent, followed by stirring at room temperature for 30 minutes, thus preparing Br$_2$PhOCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: Br$_2$PhOCF$_2$CF$_2$Cu (phen) as a brownish solid (221.22 mg).

$^1$H NMR (400 MHz, C$_6$D$_6$, rt, δ/ppm): 6.71 (br, Ar), 6.95 (br, Ar), 7.24 (br, phen), 7.36 (br, phen), 7.91 (br, phen), 8.68 (br, phen).

$^{19}$F NMR (400 MHz, C$_6$D$_6$, rt, δ/ppm): −89.5 (br, 2F), −116.3 (br, 2F)

2. Synthesis of Polymer Containing m(3-Br)PhOCF$_2$CF$_2$ Unit

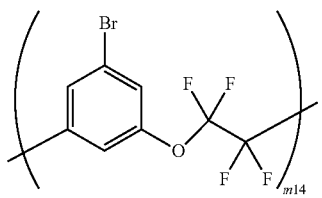

In the formula, m14 is an integer of 2 or more.

In a glove box, the THF solution (0.3 mL) of p-BrPhOCF$_2$CF$_2$Cu (phen) (17.8 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thereby giving a polymer: homopolymer of m(3-Br)PhOCF$_2$CF$_2$ as a white solid (2.47 mg).

IR peak: 1210 cm$^{-1}$, 1150 cm$^{-1}$, 636 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of m(3-Br)PhOCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 24: Film Production

By applying pressure using a mortar to the powder of the polymer containing m(3-Br)PhOCF$_2$CF$_2$ units obtained in Example 23, a transparent film was obtained.

Example 25

Synthesis of Homopolymer of p-PhOCF$_2$CF$_2$

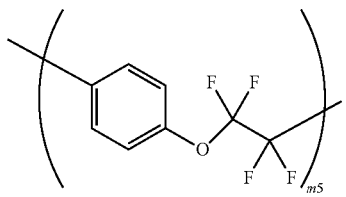

In the formula, m5 is as defined above.

In a glove box, 4-BrPhOK (21.1 mg, 0.10 mmol), CuBr (14.3 mg, 0.10 mmol), and 1,10-phenanthroline (phen: 18.0 mg, 0.10 mmol) were mixed in 100 uL of DMF solvent, followed by stirring at room temperature for 30 minutes, thus preparing 4-BrPhOCu(phen). The solution was placed in a pressure-resistant container, and TFE was pressurized to 2.0 atm, followed by heating at 100° C. for 24 hours. The unreacted TFE was degassed, the product was washed with methanol, acetone, concentrated nitric acid, and acetone in this order; and vacuum-dried, thereby giving a polymer: homopolymer of p-PhOCF$_2$CF$_2$ as a white solid (19.2 mg).

IR peak: 1205 cm$^{-1}$, 1146 cm$^{-1}$, 639 cm$^{-1}$

Using a differential scanning calorimeter (produced by Seiko Instruments Inc., product name: EXstar 6000), when a measurement was conducted in the temperature range of 100 to 430° C. at a temperature-increasing rate of 10° C./minute, a peak was observed at around 310 to 330° C. This suggests that the homopolymer of p-PhOCF$_2$CF$_2$ has a melting point at around 310 and 330° C., or causes a phase transition.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

Example 26: Film Production

By applying pressure using a mortar to the powder of the p-PhOCF$_2$CF$_2$ homopolymer obtained in Example 25, a transparent film was obtained.

Example 27: Synthesis of Homopolymer of 5-(3-Brpiridyl)OCF$_2$CF$_2$Cu (phen)

1. Synthesis of 5-(3-Brpiridyl)OCF$_2$CF$_2$Cu (phen)

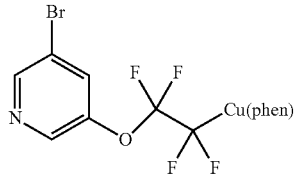

In a glove box, 3-bromo,5-hydroxypiridine (174 mg, 1.0 mmol), CuMes (182 mg, 1.0 mmol), and 1,10-phenanthroline (phen: 180 mg, 1.0 mmol) were mixed in 10 mL of THF solvent, followed by stirring at room temperature for 30 minutes, thus preparing 5-(3-Brpiridyl)OCu (phen). The solution was placed in a pressure-resistant container, and TFE was pressurized to 3.5 atm, followed by heating at 40° C. for 24 hours. The unreacted TFE was degassed, followed by concentration and washing with ether, thereby giving a complex compound: 3-Br,5-(3-Brpiridyl)OCF$_2$CF$_2$Cu (phen) as a brownish solid (180.39 mg).

$^1$H NMR (400 MHz, THF, rt, δ/ppm): 7.80 (1H), 7.97 (2H), 8.12 (2H), 8.41 (1H), 8.60 (1H), 8.67 (2H), 9.08 (2H).

$^{19}$F NMR (400 MHz, THF, rt, δ/ppm): neutral form −92.57 (br, 2F), −119.73 (br, 2F) ionic form −89.74 (br, 2F), −115.91 (br, 2F)

2. Synthesis of Homopolymer of 5-(3-brpiridyl)OCF$_2$CF$_2$Cu (phen)

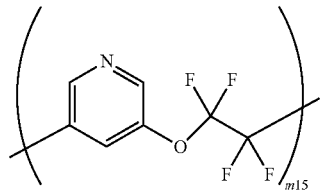

In the formula, m15 is an integer of 2 or more.

In a glove box, the THF solution (0.3 mL) of 5-(3-brpiridyl)OCF$_2$CF$_2$Cu (phen) (15.5 mg, 0.03 mmol) was added to an autoclave (50 mL), followed by heating and stirring at 100° C. for 24 hours. The product was washed with methanol, acetone, concentrated nitric acid, and acetone in this order; and vacuum-dried, thereby giving a polymer: homopolymer of p-PhOCF$_2$CF$_2$ as a white solid (3.16 mg).

IR peak: 1209 cm$^{-1}$, 1151 cm$^{-1}$, 642 cm$^{-1}$

Example 28

Synthesis of Homopolymer of Imidazolyl CF$_2$CF$_2$Cu (phen)

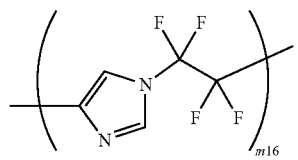

In the formula, m16 is an integer of 2 or more.

In a glove box, 4-bromoimidazole (44.0 mg, 0.30 mmol), CuMes (55 mg, 0.30 mmol), and 1,10-phenanthroline (phen: 100 mg, 0.30 mmol) were mixed in 5 mL of DMF solvent, followed by stirring at room temperature for 30 minutes, thus preparing imidazolyl Cu (phen). The solution was placed in a pressure-resistant container, and TFE was pressurized to 3.5 atm, followed by heating at 80° C. for 24 hours. After the unreacted TFE was degassed, concentration was performed and dissolution in DMF was conducted again to perform filtration. Washing was further performed with methanol and acetone; followed by vacuum-drying, thereby giving a polymer: homopolymer of imidazolyl CF$_2$CF$_2$ as a white solid (75.7 mg).

IR peak: 1209 cm$^{-1}$, 1153 cm$^{-1}$, 642 cm$^{-1}$

Example 29: Synthesis of Homopolymer of p-C$_6$H$_4$CF$_2$CF$_2$C$_6$H$_4$

1. Synthesis of p-BrC$_6$H$_4$CF$_2$CF$_2$C$_6$H$_4$Br

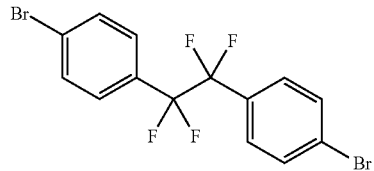 [SMILES: FC(F)(c1ccc(Br)cc1)C(F)(F)c1ccc(Br)cc1]

In a glove box, p-BrC$_b$H$_4$CF$_2$CF$_2$Cu (phen) (249 mg, 0.50 mmol) and 1-bromo-4-iodobenzene (141 mg, 0.50 mmol) were mixed in 10 mL of THF solvent, followed by stirring at 60° C. for 3 hours. After the completion of the reaction, concentration and recrystallization were performed to purify the resultant, thereby giving a white solid: p-BrC$_6$H$_4$CF$_2$CF$_2$C$_6$H$_4$Br (225 mg).

$^1$H NMR (400 MHz, C$_6$D$_6$, rt, δ/ppm): 7.58 (d, 4H), 7.33 (d, 4H)

$^{19}$F NMR (400 MHz, C$_6$D$_6$, rt, δ/ppm): −114.5 (s, 4F)

2. Synthesis of Homopolymer of p-C$_6$H$_4$CF$_2$CF$_2$C$_6$H$_4$

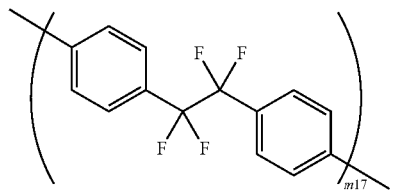

In the formula, m17 is an integer of 2 or more.

In a glove box, the DMF solution (0.03 mL) containing p-BrC$_6$H$_4$CF$_2$CF$_2$C$_6$H$_4$Br (12.3 mg, 0.03 mmol), Ni(cod)$_2$ (9.9 mg, 0.036 mmol), bpy (5.64 mg, 0.036 mmol), and COD (3.7 μL, 0.03 mmol) were added to an autoclave (50 mL), followed by heating and stirring at 60° C. for 16 hours. The product was washed with methanol, acetone, and water in this order; and vacuum-dried, thereby giving a polymer: homopolymer of p-PhCF$_2$CF$_2$ as a white solid (4.99 mg).

Example 30: Synthesis of Polymer Containing p-C$_f$H$_4$OCF$_2$CF$_2$C$_6$H$_4$ Unit 1. Synthesis of p-BrC$_6$H$_4$OCF$_2$CF$_2$C$_6$H$_4$Br

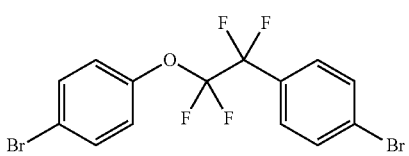 [SMILES: FC(F)(Oc1ccc(Br)cc1)C(F)(F)c1ccc(Br)cc1]

In a glove box, p-BrPhOCF$_2$CF$_2$Cu (phen) (258 mg, 0.50 mmol) and 1-bromo-4-iodobenzene (141 mg, 0.50 mmol) were mixed in 10 mL of THF solvent, followed by stirring at 60° C. for 3 hours. After the completion of the reaction, concentration and purification with silica gel chromatography was performed, thereby giving an oily transparent liquid: p-BrC$_6$H$_4$OCF$_2$CF$_2$C$_6$H$_4$Br (172.48 mg).

$^1$H NMR (400 MHz, C$_6$D$_6$, rt, δ/ppm): 7.64 (d, 2H), 7.53 (d, 2H), 7.45 (d, 2H), 7.22 (d, 2H).

$^{19}$F NMR (400 MHz, C$_6$D$_6$, rt, δ/ppm): −117.3 (t, 2F), −90.5 (t, 2F)

2. Synthesis of Homopolymer of p-C$_6$H$_4$OCF$_2$CF$_2$C$_6$H$_4$

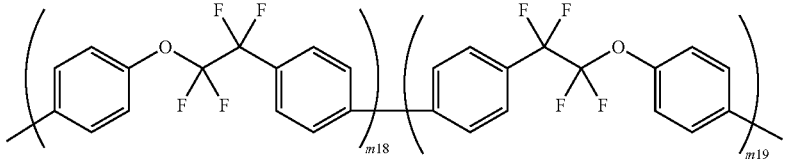

In the formula, m18 and m19 are the same or different, and are an integer of 1 or more.

In a glove box, the DMF solution (0.03 mL) of p-BrC$_6$H$_4$OCF$_2$CF$_2$C$_6$H$_4$Br (12.8 mg, 0.03 mmol), Ni(cod)$_2$ (9.9 mg, 0.036 mmol), bpy (5.64 mg, 0.036 mmol), and COD (3.7 μL, 0.03 mmol) was added to an autoclave (50 mL), followed by heating and stirring at 60° C. for 16 hours. The product was washed with methanol, acetone, and water in this order; and vacuum-dried, thereby giving a polymer: homopolymer of p-PhOCF$_2$CF$_2$ as a white solid (5.74 mg).

FT-IR (ATR): ν$_{CF}$ (cm$^{-1}$): 1207, 1151. ν$_{CH}$ (cm$^{-1}$): 638.

When a measurement was conducted in the temperature range of 100 to 700° C. at a temperature-increasing rate of 10° C./minute using a thermogravimetric measurement apparatus (produced by Hitachi High-Tech Sci. Corp., product name: STA7200RV), the weight was reduced by 5% at around 520° C.

The invention claimed is:

1. A polymer having a monomer unit represented by the following formula (1):

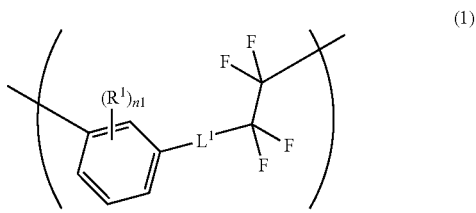

wherein

R$^1$ in each occurrence is independently a halogen atom, or a NR$^{11}$R$^{12}$ group wherein R$^{11}$ and R$^{12}$ are independently a hydrogen atom or an organic group, or an organic group;

n1 is an integer of 0 to 4;

two R$^1$s that can be present in the ortho-positions may form a ring together with two carbon atoms on the adjacent benzene ring, wherein the formed ring may have an organic group as a substituent; and L$^1$ is an oxygen atom, a sulfur atom, -L$^{11}$-O—, —O-L$^{12}$-O—, -L$^{13}$-S—, or —S-L$^{14}$-S—, wherein L$^{11}$ to L$^{14}$ are each independently an alkylene group optionally having one or more substituents.

2. The polymer according to claim 1, wherein L$^1$ is an oxygen atom, -L$^{11}$-O—, or —O-L$^{12}$-O—.

3. The polymer according to claim 1, wherein n1 is 0, 1, or 2.

4. The polymer according to claim 1, further having a monomer unit represented by the following formula (2):

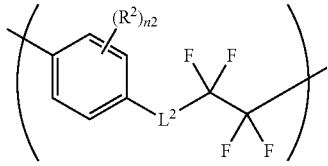

(2)

wherein $R^2$ in each occurrence is independently a halogen atom, or a $NR^{21}R^{22}$ group wherein $R^{21}$ and $R^{22}$ are independently a hydrogen atom or an organic group, or an organic group;

n2 is an integer of 0 to 4;

two $R^2$s that can be present in the ortho-positions may form a ring together with two carbon atoms on the adjacent benzene ring, wherein the formed ring may have an organic group as a substituent; and $L^2$ is a single bond, an oxygen atom, a sulfur atom, $-L^{21}$-O—, —O-$L^{22}$-O—, -$L^{23}$-S—, or —S-$L^{24}$-S—, wherein $L^{21}$ to $L^{24}$ are each independently an alkylene group optionally having one or more substituents.

5. The polymer according to claim 1, further having a monomer unit represented by the following formula (2):

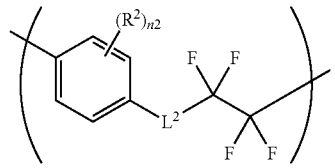

(2)

wherein $R^2$ in each occurrence is independently a halogen atom, or a $NR^{21}R^{22}$ group wherein $R^{21}$ and $R^{22}$ are independently a hydrogen atom or an organic group, or an organic group;

n2 is an integer of 0 to 4;

two $R^2$s that can be present in the ortho-positions may form a ring together with two carbon atoms on the adjacent benzene ring, wherein the formed ring may have an organic group as a substituent; and $L^2$ is a single bond, an oxygen atom, -$L^{21}$-O—, or —O-$L^{22}$-O—, wherein $L^{21}$ and $L^{22}$ are each independently an alkylene group optionally having one or more substituents.

6. A film containing the polymer of claim 1.

* * * * *